INVENTOR.
Lynn A. Williams
BY
Wipper, Gradolph & Love
Attys

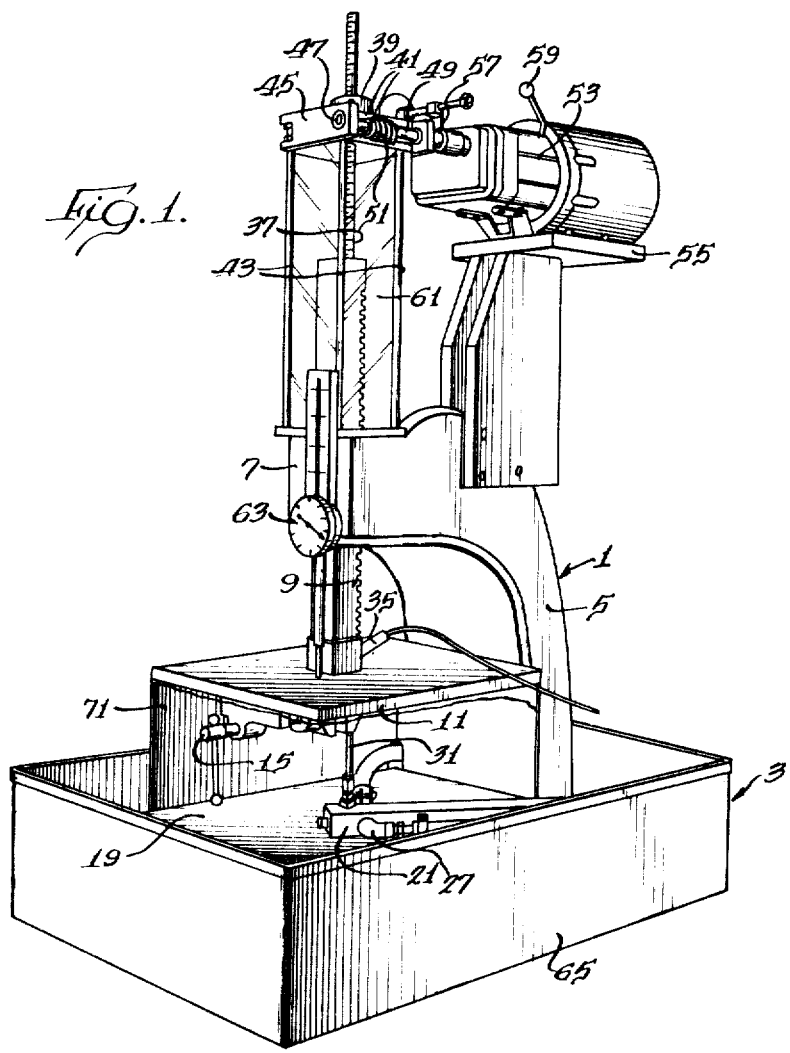

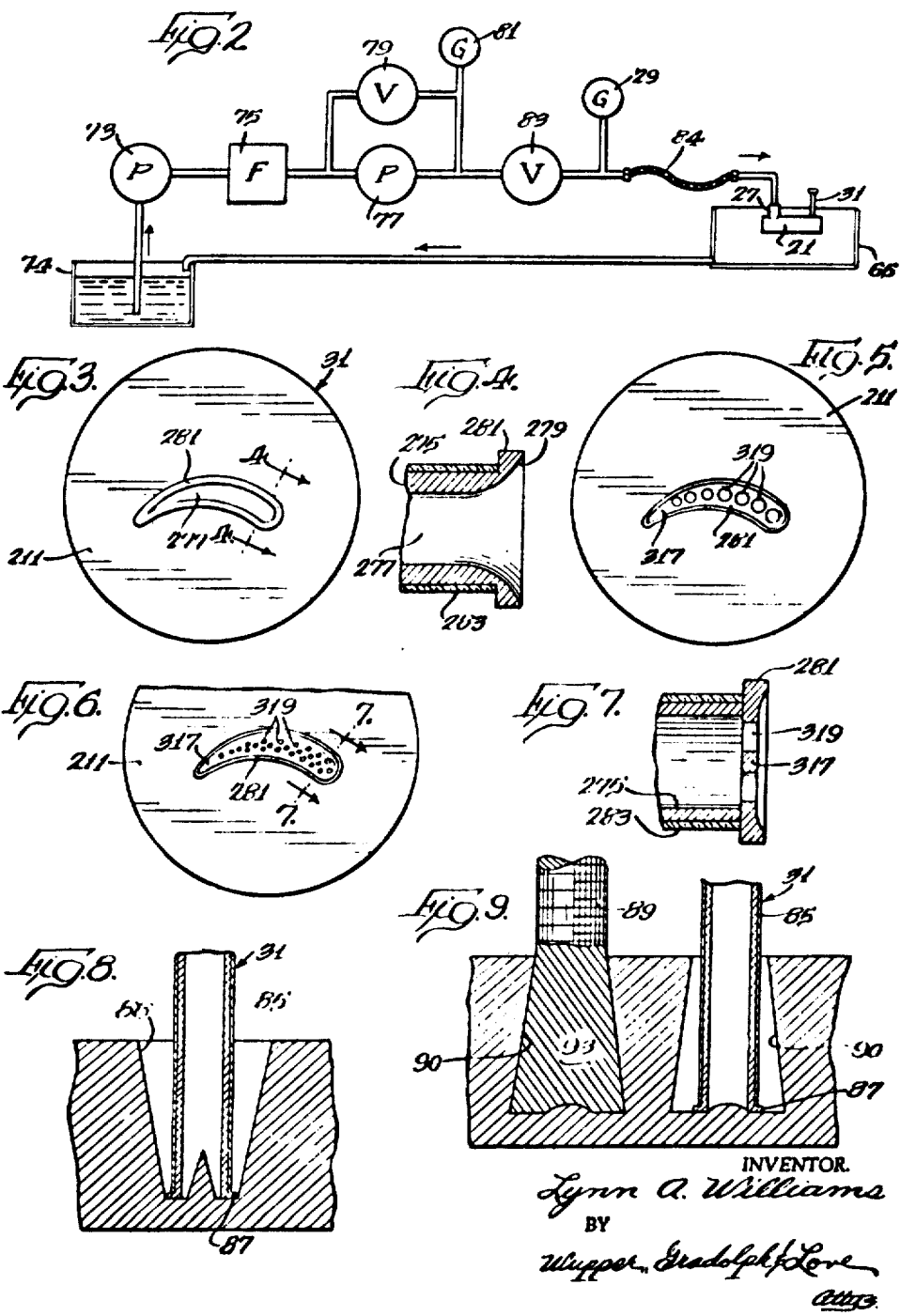

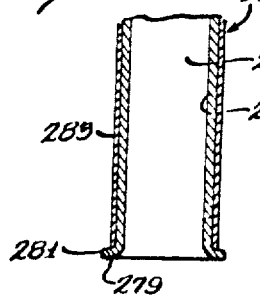
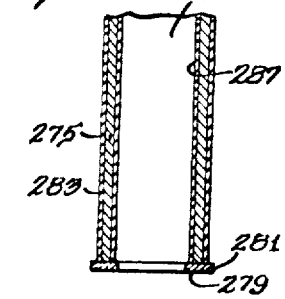
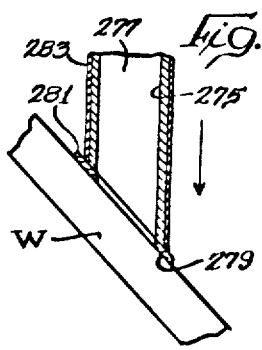
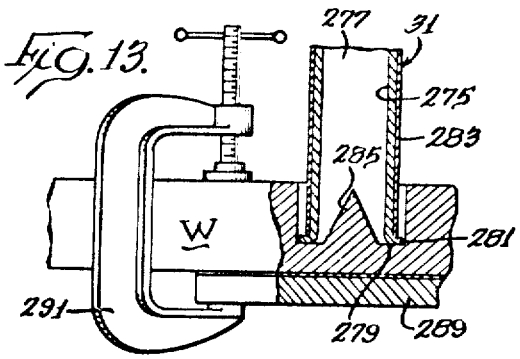
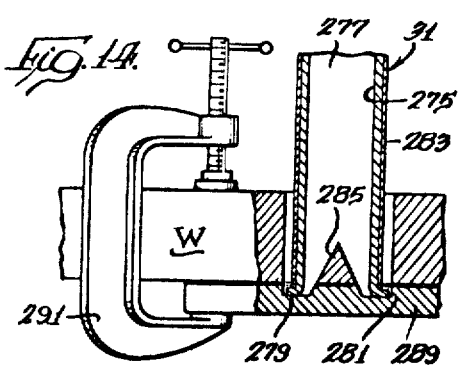
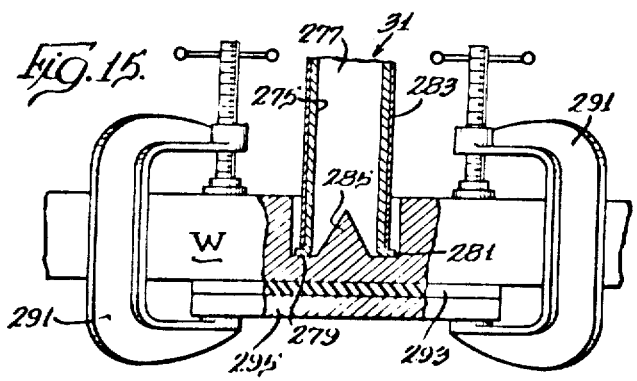
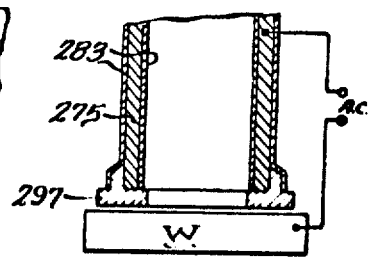
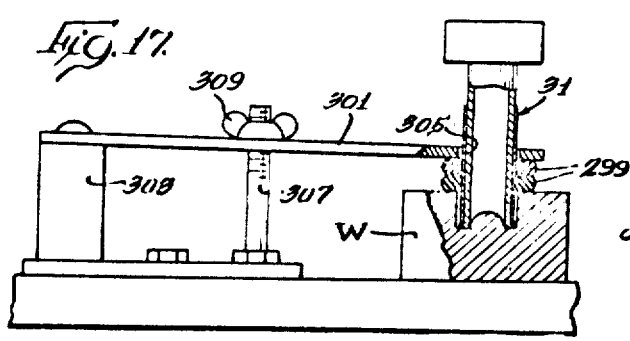

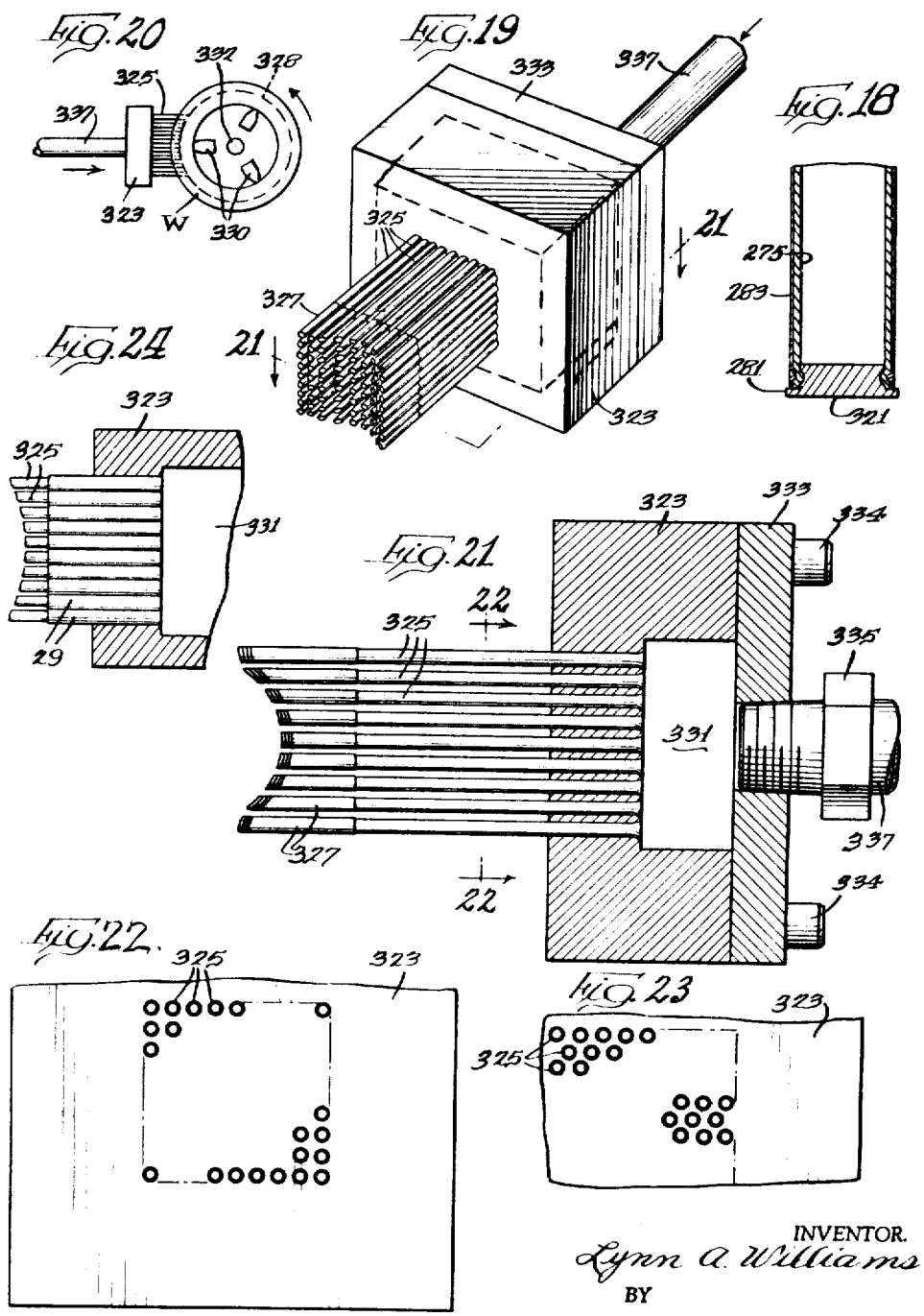

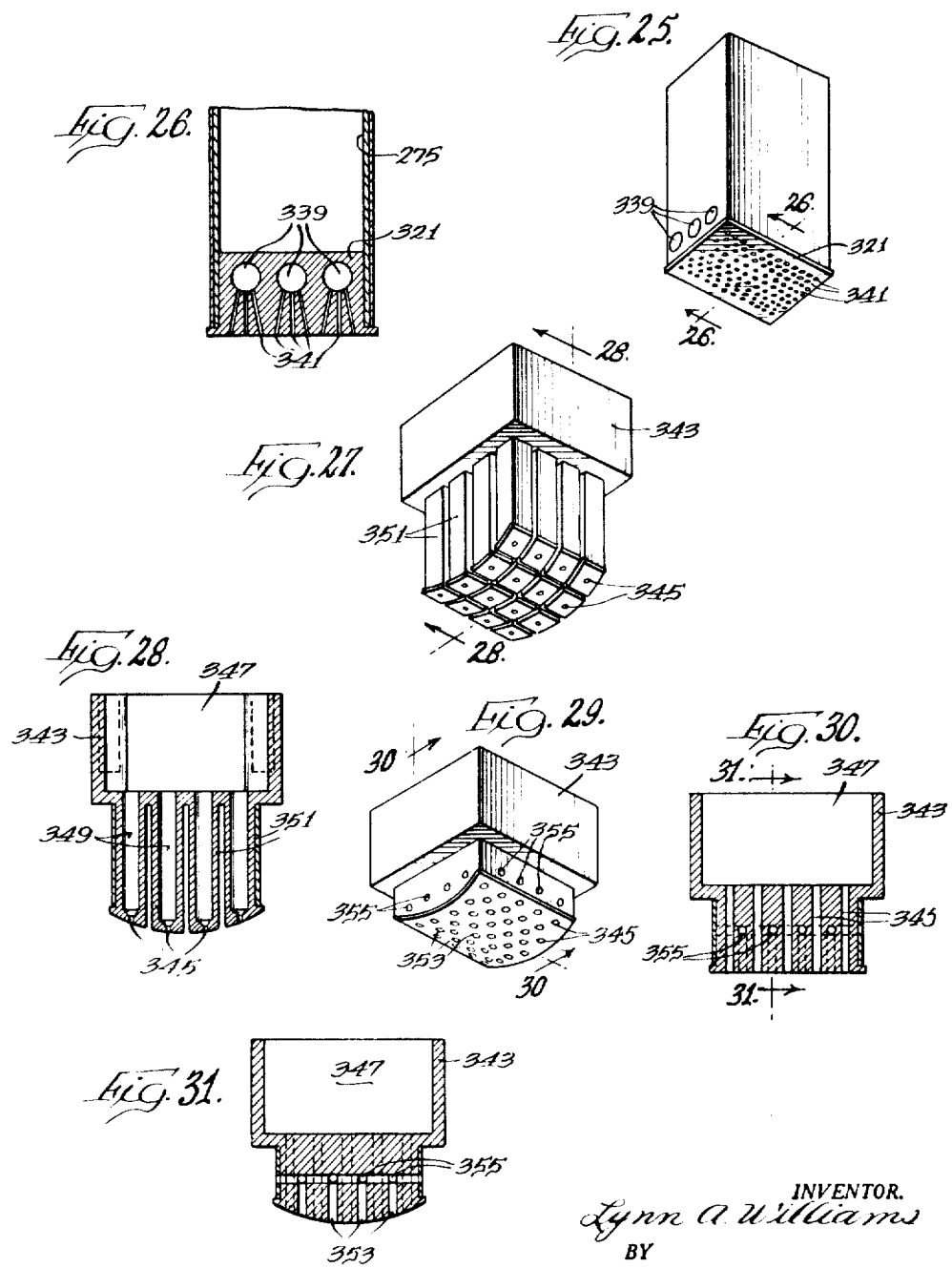

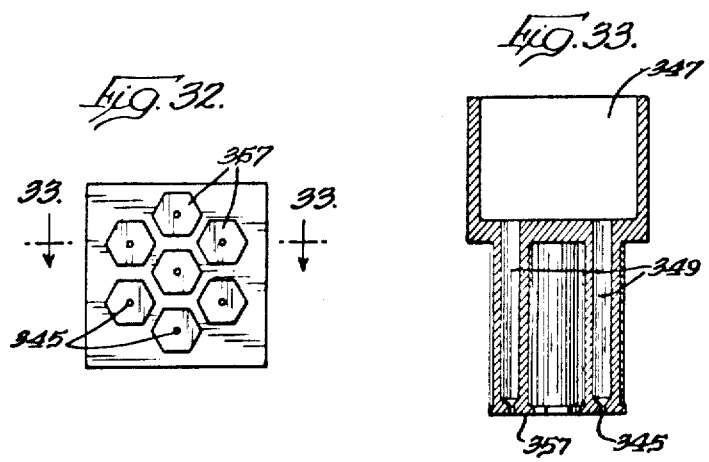
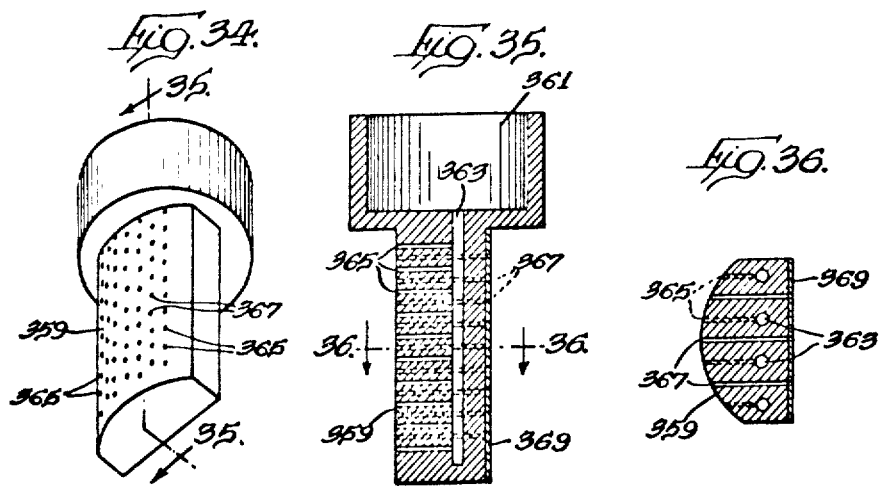

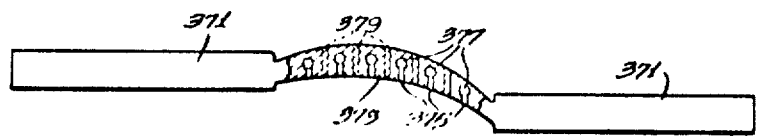
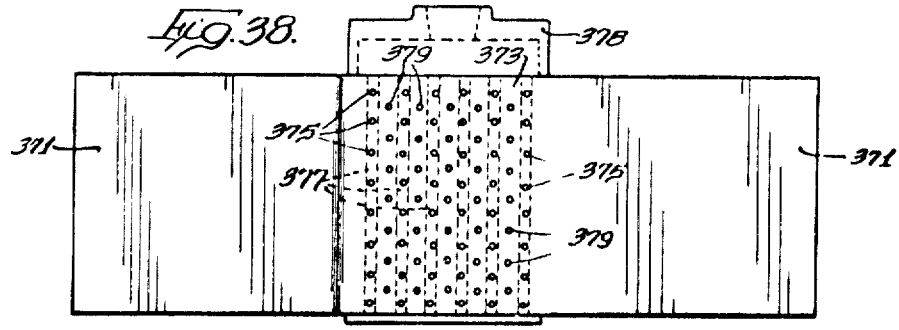
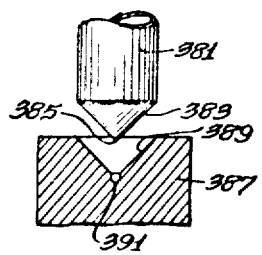 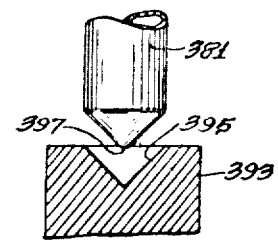
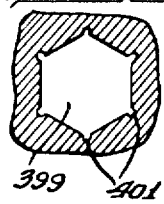 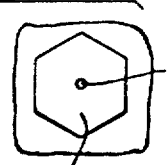 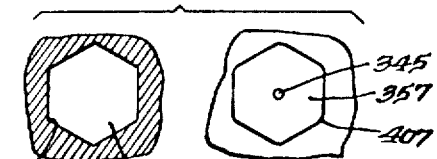

Jan. 14, 1969 L. A. WILLIAMS 3,421,997
ELECTRODE FOR ELECTROLYTIC SHAPING
Original Filed Nov. 10, 1958 Sheet 9 of 10
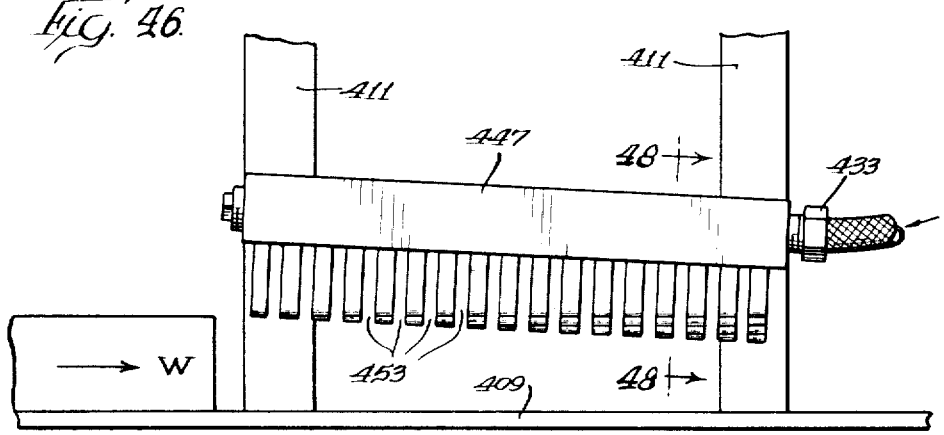
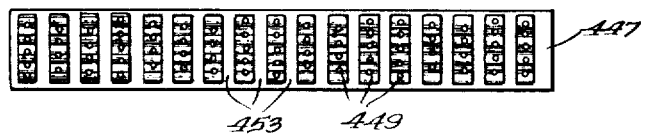
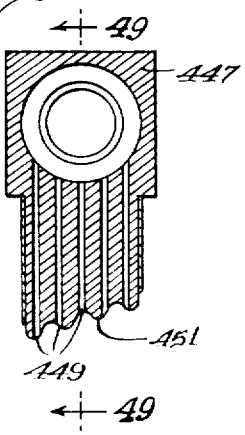
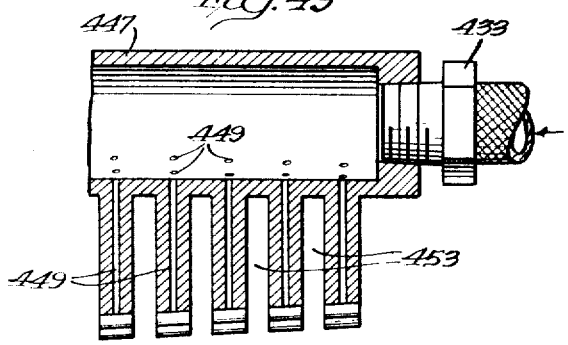
INVENTOR.
Lynn A. Williams
BY
Wupper, Bradolph & Love
Attys.

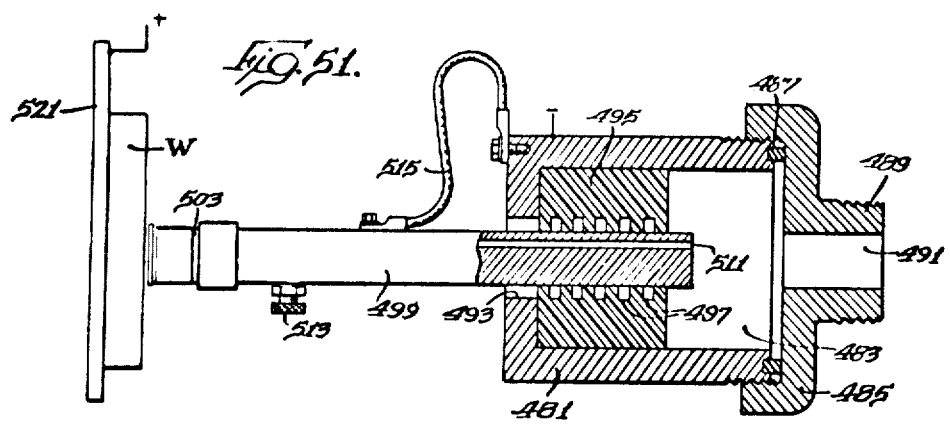
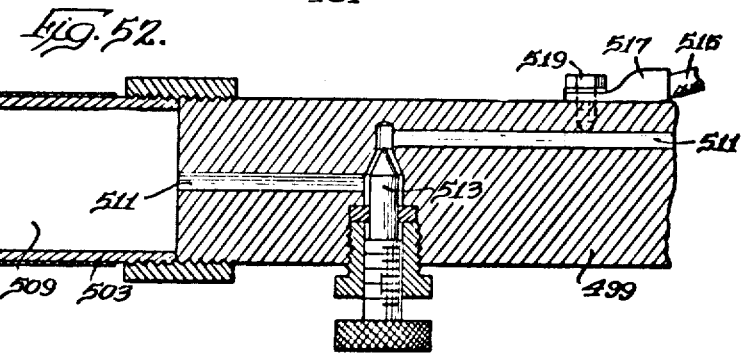
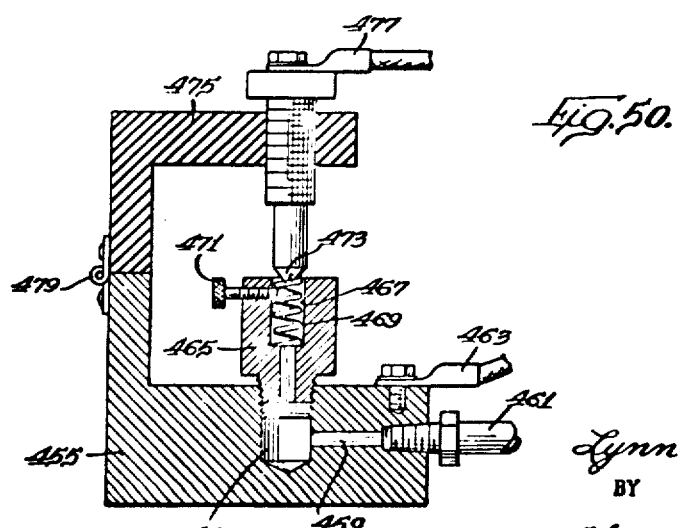

United States Patent Office 3,421,997
Patented Jan. 14, 1969

---

3,421,997
ELECTRODE FOR ELECTROLYTIC SHAPING
Lynn A. Williams, Winnetka, Ill., assignor to Anocut Engineering Company, Chicago, Ill., a corporation of Illinois
Continuation of application Ser. No. 165,569, Jan. 11, 1962, which is a division of application Ser. No. 772,960, Nov. 10, 1958, now Patent No. 3,058,895, dated Oct. 16, 1962. This application Feb. 14, 1966, Ser. No. 552,652
U.S. Cl. 204—284    8 Claims
Int. Cl. B01k *3/04*; B23p *1/02*; C23b *5/74*

This application is a continuation of my pending application Ser. No. 165,569, filed Jan. 11, 1962, and now abandoned, which application is a division of my application Ser. No. 772,960, filed Nov. 10, 1958, entitled, "Electrolytic Shaping," now issued into Patent No. 3,058,-895, dated Oct. 16, 1962.

This invention relates to electrodes for the use in electrochemically shaping metal and metalloid materials.

It has long been known that metal and metalloid materials may be removed by electrolytic attack in a configuration where the metal or metalloid workpiece is the anode in an electrolytic cell. This principle has been used industrially to some degree for the removal of defective plating and the like, and is sometimes referred to as "stripping." It has also been used to some extent for electrolytic polishing, in which application, however, the principal purpose is to produce a smooth finish with a minimum removal of the work material. Here the purpose is to remove substantial amounts of metal rapidly and with accuracy.

In the present instance, the term "metalloid" is used somewhat specially in referring to those electrically conductive materials which act like metals when connected as an anode in an electrolytic cell and are capable of being electrochemically eroded. The term as used here and in the claims includes metals and such similarly acting materials as tungsten carbide, for instance, and distinguishes from such conductive nonmetalloids as carbon.

George F. Keeleric has proposed in his Patent No. 2,826,540, issued Mar. 11, 1958, for "Method and Apparatus for Electrolytic Cutting, Shaping and Grinding" the use of electrolysis in conjunction with a metal bonded, abrasive bearing, moving electrode, and the method and apparatus of this Keeleric patent have found extensive industrial use.

The present invention departs from the teachings of Keeleric in utilizing relatively fixed or slow moving electrodes without abrasive, and is intended for work of a quite different character, as will appear in the detailed description of the invention which follows.

In general, in the present invention an electrode, quite frequently a hollow electrode, is advanced into the work material by mechanical means while electrolyte is pumped through the work gap between the electrode and the work, and at times the hollow portion of the electrode, under substantial pressure. In some circumstances, the side walls of the electrode are protected by an insulating material so as to minimize removal of work material except where desired. Various forms of electrodes are used for different kinds of work, and likewise different techniques advancing the electrode toward and into the work material are used, depending upon the nature of the operation to be performed. An important aspect of the invention lies in providing electrodes in which a flow of electrolyte between the electrode and the work is maintained at high velocity and across a short path between the point of entry and the area of exit regardless of the overall size of the electrode. An electric current is supplied so that current passes from the electrode, which is negative, through the electrolyte to the workpiece, which is positive. For purposes of shaping the electrodes, direct current may be passed in the opposite sense to make the electrode positive. In some instances, alternating current may be used.

Among the objects of the invention are the following:

To provide novel apparatus for rapid removal of work material by electrolytic means;

To provide novel apparatus for imparting desired shapes and contours to a workpiece by electrolytic action;

To provide improved electrodes for electrolytic shaping of work materials;

To provide a novel technique for producing shaped electrodes; and

To provide automatic means for advancing electrodes toward and into the work material.

Other objects and advantages will become apparent from the following description taken in conjunction with the accompanying drawings in which:

FIG. 1 is a perspective view of one form of apparatus utilizing the electrode of the present invention;

FIG. 2 is a diagrammatic representation of an electrolyte supply system which forms a portion of the apparatus of FIG. 1;

FIG. 3 is an end view of one form of electrode of the present invention and useful with the apparatus of FIG. 1;

FIG. 4 is an enlarged fragmentary sectional view through a portion of the electrode of FIG. 3 taken substantially along the line 4—4 of FIG. 3, looking in the direction of the arrows;

FIGS. 5 and 6 are end views, similar to FIG. 3, showing other forms of the electrode of the present invention;

FIG. 7 is an enlarged fragmentary sectional view taken substantially along the line 7—7 of FIG. 6, looking in the direction of the arrows;

FIGS. 8 and 9 are transverse sectional views taken through an electrode of the present invention, and through the work associated therewith, showing the influence upon the work of the speed of advance of the electrode;

FIG. 10 is a longitudinal medial sectional view through another form of electrode showing the general arrangement and conformation of the elements thereof;

FIG. 11 is a view generally similar to FIG. 10 illustrating an electrode adapted for a trepanning operation;

FIG. 12 is a medial sectional view of the working tip of an electrode and the work (shown in side elevation) to be operated upon in an application where the electrode is advanced into the work at an angle to the work surface;

FIGS. 13 and 14 are side elavations, partly in section, showing an arrangement for electrolytically piercing a hole completely through a workpiece;

FIG. 15 is a view similar to FIGS. 13 and 14 showing an alternative arrangement for piercing a hole through the workpiece from one side to the other;

FIG. 16 is a longitudinal sectional view of an alternative form of electrode particularly adapted for use with alternating current;

FIG. 17 is a side elevation, partly in section, illustrating an arrangement for electrolytically producing a cavity under conditions where it is desired to have a high spectral finish upon the walls thereof;

FIG. 18 is a longitudinal sectional view through an alternative electrode tip which makes use of a porous metal element at the working face thereof;

FIG. 19 is a perspective view of one form of electrode for forming comparatively large cavities of irregular shape in the bottom surface thereof;

FIG. 20 shows an adaptation of the electrode of FIG. 19 for operation upon a rotating workpiece;

FIG. 21 is a longitudinal sectional view through the electrode of FIG. 19, taken substantially along the line 21—21 of FIG. 19, looking in the direction of the arrows;

FIG. 22 is a transverse sectional view through a portion of the electrode of FIG. 21 taken along the line 22—22 of FIG. 21, looking in the direction of the arrows;

FIG. 23 is a view similar to FIG. 22 showing an alternative arrangement of the electrode elements which may be used in place of the arrangement of FIG. 22;

FIG. 24 is a longitudinal sectional view through an electrode generally similar to that of FIG. 21 illustrating an alternative method of constructing the electrode;

FIG. 25 is a perspective view of the working end of an electrode in which the working tip is formed of a porous metal and particularly adapted for sinking cavities of comparatively large area;

FIG. 26 is a transverse sectional view taken along the line 26—26 of FIG. 25, looking in the direction of the arrows;

FIG. 27 is a perspective view of an alternative electrode particularly adapted for sinking cavities of comparatively large area and particularly adapted for producing cavities having a curved or irregularly shaped bottom surface;

FIG. 28 is a longitudinal sectional view taken along the line 28—28 of FIG. 27, looking in the direction of the arrows;

FIGS. 29 and 30 are views similar to FIGS. 27 and 28, excepting that they illustrate an alternative form of electrode;

FIG. 31 is a sectional view taken along the line 31—31 of FIG. 30, looking in the direction of the arrows;

FIG. 32 is an end view of an electrode particularly adapted for producing a plurality of cavities simultaneously so as to have walls of a generally honeycomb conformation between the cavities;

FIG. 33 is a longitudinal sectional view taken along the line 33—33 of FIG. 32, looking in the direction of the arrows;

FIG. 34 is a perspective view of an electrode particularly adapted for operation in confined spaces;

FIG. 35 is a longitudinal sectional view taken along the line 35—35 of FIG. 34, looking in the direction of the arrows;

FIG. 36 is a transverse sectional view taken along the line 36—36 of FIG. 35, looking in the direction of the arrows;

FIG. 37 is a side view, partly in section, of an electrode adapted for use in the finishing of comparatively large surface areas in relatively confined environments;

FIG. 38 is a view of the working face of the electrode of FIG. 37;

FIG. 39 is a somewhat diagrammatic illustration of the manner in which the cavity produced by an electrode has a contour which is irregular with respect to the electrode under certain conditions;

FIG. 40 is a view similar to FIG. 39 illustrating one manner of overcoming the difficulty illustrated in FIG. 39;

FIGS. 41 and 42 are views similar to FIGS. 39 and 40, excepting that they illustrate the same problem and the solution thereof under somewhat different circumstances;

FIG. 46 is a view similar to FIG. 43 but showing an electrode for contouring surface areas, particularly under conditions where the contour produced is irregular in one direction;

FIG. 47 is a view of the working surface of FIG. 46;

FIG. 48 is a vertical sectional view taken along the line 48—48 of FIG. 46, looking in the direction of the arrows;

FIG. 49 is a fragmentary longitudinal sectional view taken along the line 49—49 of FIG. 48, looking in the direction of the arrows;

FIG. 50 is a vertical sectional view through a fixture according to the present invention which provides in adaptation of the invention of the problem of debarring compression springs and similar articles;

FIG. 51 is a fragmentary sectional view through an electrode of the present invention showing an arrangement for using the hydraulic pressure of the electrolyte for advancing the electrode into the work at the proper rate; and FIG. 52 is a fragmentary sectional view on a larger scale showing the lower portion of the electrode and electrode mount of FIG. 51.

Figure 43:
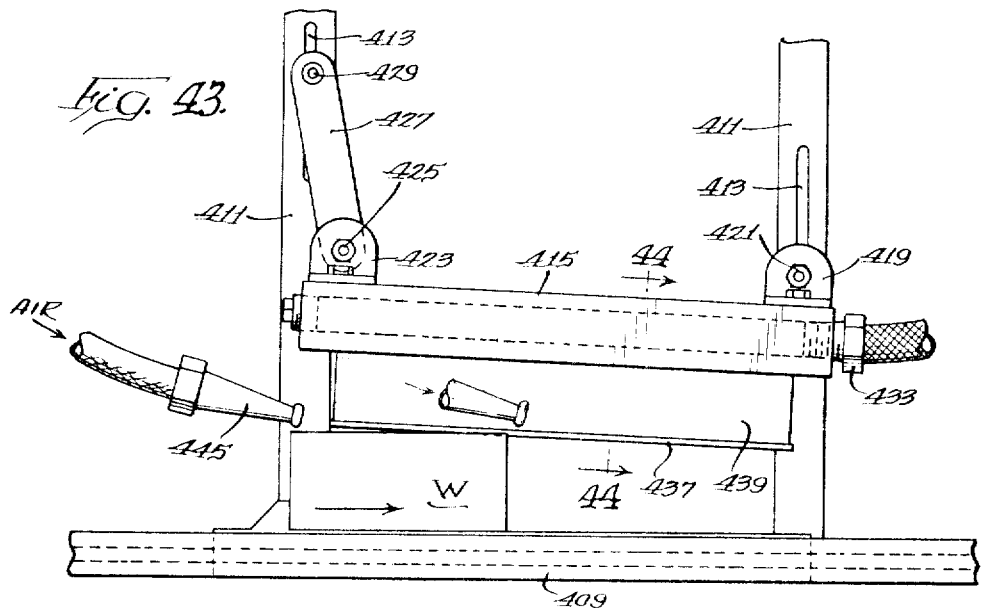
FIG. 43 is a diagrammatic side view of an adaptation of the invention for the production of a straight slot in a workpiece.

Referring to FIG. 1, the apparatus includes a frame member 1 which in this instance is the frame member of a conventional and well known arbor press sold under the trade name of Famco. It includes a base section 3, a column 5, and a head 7 which is adapted in the conventional manner to accommodate a ram 9 for vertical reciprocating motion. The detail of the ram mounting is not important to this invention, but it is desirable to provide adjustable gibs or the equivalent in the head so that the ram may move vertically with a smooth action and without lateral play which might introduce undesired side motion. To the bottom end of the ram 9 there is mounted a workplate 11 through which a plurality of bolt holes is provided to permit adjustable mounting of a work-holding vise 15.

On the base portion 3 there is mounted a metal bottom plate and on top of this a waterproof, chemical-resistant plastic mounting plate 19. This is provided with a number of threaded bolt holes to permit mounting of an electrode holder 21, which is made of suitable metal and is provided with one or more mounting slots so that it can be adjusted as to its position by selection of the suitable bolt holes in mounting plate 19.

At the working end, the electrode support member 21 is hollow and is adapted to receive an electrolyte feed tube fitting 27 connected to a line leading to a source of electrolyte under pressure.

Extending from the upper surface, there is mounted an electrode 31, shown here as fastened by brazing to a pipe nipple threaded into the electrode support member 21. Within the hollow support member 21 the electrode is connected by a suitable passage to the feed tube fitting 27.

An electric cable is connected to the electrode block or support member 21 and supplies current from the power source. Another electric cable 35 is fastened to work plate 11 to furnish the other (normally positive) connection from the power source.

To move the work plate 11 up and down, a lead screw 37 is secured to and extends upwardly from the upper end of the ram 9. A lead nut 39 is threaded upon the lead screw and is mounted between two horizontal plates 41 which are supported by four column bars 43. The lead nut peripherally is formed as a worm gear so that it may be rotated to move the lead screw 37 up and down. A journal plate 45 is mounted to the plates 41 and carries a bearing bushing 47 which supports the outboard end of a drive shaft 49 which carries worm 51 meshed with the peripheral worm gear of lead nut 39.

The worm drive shaft 49 is in turn rotated by a variable speed electric motor drive 53 mounted upon a platform 55 attached to the column 5. This drive mechanism has a speed adjusting handle 57 and a reversing handle 59, the latter having a neutral mid-position as well as updrive and downdrive positions.

The sizes and proportions of the drive parts are arranged to permit adjustment in the vertical speed of movement of the work plate 11 from zero to one inch per minute. The motion must be smooth, not jerky, and accordingly, reasonable accuracy and freedom from excessive friction are an advantage in the moving drive parts. The lead screw 37 may be protected against splatter and corrosion by a plastic enclosure 61 wrapped around the column bars 43.

A conventional dial indicator 63 is shown as mounted to the head 7 of column 5 and has its working tip extended downwardly against the upper surface of work plate 11 so as to indicate relative movement as between these elements.

The entire assembly is mounted in a pan 65 which has an outlet spud adapted to drain electrolyte back into a supply sump or reservoir 74. The work plate 11 is fitted with plastic curtains 71 which can be tucked down below the level of the pan top to prevent excessive splatter.

The plumbing system (FIG. 2) comprises a low pressure pump 73 which feeds electrolyte from the reservoir 74 through a filter 75 into high pressure pump 77, the outlet of which leads to a bypass valve 79 which may be either manually set or of the spring loaded constant pressure type. On the inlet side of the bypass valve 79 a pressure gauge 81 is mounted. Also from the inlet side, a pipe lead is taken through a needle valve 83 to an electrolyte feed tube 84 leading to the electrode fitting 27. A second gauge 29 is connected to the feed tube 84 so as to indicate the pressure at the electrode.

In operation, a workpiece is positioned in the vise 15 above the electrode 31, and the work plate 11 is then driven down until the workpiece is almost touching electrode 31 as gauged by a piece of paper or shim of known thickness, say .003 inch. The dial indicator 63 is then adjusted to zero minus the known thickness, .003 inch in this example. The curtains 71 are lowered or otherwise closed, the electrolyte pumps 73 and 77 are started, and the valves 79 and 83 are adjusted so that gauge 81 reads about 120 p.s.i. and gauge 29 about 90 p.s.i. This is done while the reversing handle 59 is in neutral position. Then, simultaneously, the reversing handle is moved to down-drive position, and the electric power supply is turned on.

As the electrode approaches the workpiece, there will be a rise in pressure at the gauge 29. If the capacity of pumps 73 and 77 is several times the free flow discharge rate through the electrode, the pressure upstream of the needle valve 83 and of bypass valve 79 as read at gauge 81 will change scarcely at all with changes in proximity of the electrode 31 to the work, for most of the flow is passing through bypass valve 79, and it is the adjustment of this which is principally determinative of the pressure at gauge 81. In short, the pumps and plumbing system up to needle valve 83 constitute a substantially constant pressure source. The same result may be obtained in many other ways. A constant pressure type pump may be used, e.g., a centrifugal pump operating near cutoff. Or a pressure regulator may be used. Or a spring loaded relief valve adapted to maintain constant pressure may be used.

Needle valve 83, however, is set so as to constitute a sufficient restriction to flow so that when the electrode is discharging into the open, the pressure as read at gauge 29, will be noticeably lower than when its outlet is restricted by being in close proximity to the work.

Thus, gauge 81 normally reads 120 p.s.i., then when the electrode 31 touches the workpiece so as to shut off the flow, or nearly so, the pressure downstream of needle valve 83 as read at gauge 29 will rise to almost the same value, 120 p.s.i. If, however, the electrode 31 is spaced away by several thousandths of an inch, the pressure at gauge 29 will drop, say to 90 p.s.i.

This change in liquid pressure may be used in adjusting the rate of feed of the work toward the electrode. The initial feed rate may be set at a low level (for an unknown working condition or work material) and then increased by adjustment of the handle 57. Gauge 29 is observed to watch for a pressure rise which approaches that of gauge 81. It takes a little time for the pressure reading to stabilize during actual removal operations, for inasmuch as material is being removed by anodic dissolution, it is necessary for the moving electrode to catch up with the receding work material and to establish an equilibrium spacing distance, for as the electrode comes closer to the work, the removal rate tends to increase. By the exercise of reasonable care, it is possible to make a precise adjustment such that the electrode pressure gauge 29 reads only a few pounds per square inch lower than gauge 81, indicating that the electrode is moving forward at such a rate as to leave only a small gap between the electrode and the work.

In effect, this hydraulic system constitutes a flow meter, and the same result may be obtained by using a more formal flow meter to sense the flow rate through the gap between the electrode and the work. Such flow meter may be of any suitable sort, as for instance of the orifice type (which, in effect, uses the principle of the system just described) or of some other type, for example, that in which a moving bob is supported by upward flow in a conical glass vessel (e.g., the Fischer & Porter type).

It is not easy to measure this gap with accuracy, as apparently it is not always uniform at every point, but as measured in a practical way, by turning off the current and advancing the electrode until it seems to bottom, the distance may be as small as .001 inch or less, to as much as .010 inch, with satisfactory results, although it is preferred to work with the shortest spacing distance which can be managed without causing occasional contact and arcing between the electrode and the work, and I have found that about .002 inch to .005 inch is usually a safe distance while still permitting rapid removal of work material.

In general, low voltages and close spacing, of the order of .001 inch to .005 inch, give high removal rates and low electric power costs and a higher degree of accuracy, but less striation is produced upon the side wall of the work cavity when greater spacing, of the order of .010 inch, is used. The greater spacing results in a lower work removal rate unless the voltage is raised however, since removal rate is a function of current. As a practical matter in most applications, I prefer to use about 10 volts and from 100 to 3000 amperes per square inch of active electrode area.

It should be noted that work material is removed by electrolytic action, not by spark or arc erosion, as with the so-called electrodischarge method. This is important for several reasons, among them the fact that damaging thermal metallurgical effects on the work material are avoided and that there is virtually no erosion of the electrode. The fact that the electrode is not eroded is of great importance where the cavity is to be accurately shaped, for accurate shaping is rendered very difficult when the electrode is being eaten away at a rate rapid enough to alter its dimensions during the operation.

Thus, it is important to avoid too fast a feed rate which may cause arcing between the electrode and the work.

Another method of gauging the feed rate is by reference to an ammeter in the electrolytic power supply circuit. Once the penetration of the electrode into the work has been well established, the rate of feed is gradually increased until an arc is observed. Usually this will be of short duration. The reading of the ammeter is observed and read just prior to the first arc, and the speed is then adjusted downwardly until the ammeter shows a reading of little below the critical point where the first arc occurred.

A transducer sensitive to either the electrolyte liquid flow rate or the electrolytic electric current may be used as the signal generating element in an automatic feed control system.

If the electrode 31 used is of the general type illustrated in FIGS. 3 to 9, for instance, in which the exterior surface is insulated as at 85 by a ceramic coating or the like, with only a narrow lip 87 at the exposed end, then if the electrode is advanced at a constant rate, the cavity produced will have substantially straight sides, for the electrolytic removal on the sides of the cavity will be substantially uniform. If, however, the rate of advance of the electrode is slowed, there will be a widening of the cavity because of the longer exposure to side action. Conversely, if the rate at the beginning is slow and is then accelerated, the cavity will be narrower. By reference to the liquid pressure at gauge 29 as previously described, or to some other form of flow measurement, the penetration rate may be varied so as to produce variations in the lateral dimensions of the cavity.

A similar result may be obtained by reference to the ammeter in the electrolytic power circuit.

Referring to FIG. 8, a tapered cavity 88 may be produced by the step of adjusting the feed rate of the electrode into the work during the progress of the "cut" from a very slow rate at the outset to a rate approaching the maximum permissible. In FIG. 9, a rather startling result, the production of a reverse taper 90 larger at the bottom than at the opening, is illustrated. This is accomplished quite simply by starting with the maximum feed rate obtainable without arcing, which is then gradually reduced to a very slow rate as the cut progresses.

The ordinary taper, as in FIG. 8, may be used in such applications as the making of integral turbine blades in the periphery of a disc of super-alloy material. Since the blades to be left standing are thinner at the tips than at the root, and since the circumference of the disc is greater at the tips, it follows that the major portion of the material between the blade portions must be removed at the beginning of the "cut," with progressively less material being removed toward the root. The effect may be increased by omitting the insulation 85, or by using an imperfect insulating layer on the electrode and by eliminating the projecting lip 87 at the working tip. These and other factors influencing electrode design will be described in greater deail subsequently.

The reverse taper 90 shown in FIG. 9 may be made with a cylindrical electrode and may be used where it is desired to anchor a bolt, stud, or the like. If the part 89 to be anchored is somewhat ductile, it may be driven into the reverse tapered cavity 90 with enough force to cause the end portion to flow and expand within the cavity as at 93, substantially filling it, and thus providing a very firm fastening.

A simple form of feed device may be made for making simple holes where low costs may override considerations of accuracy, versatility and reliability found in one of the more complex forms of the invention. This form is shown in FIGS. 51 and 52.

In this simple form, the hydrostatic pressure of the electrolyte itself is used to advance the electrode into the work.

Referring to FIG. 51, a cup-shaped cylindrical metal body 481 having a central cylindrical cavity or chamber 483 is fitted with a removable, screw threaded cap 485 and a sealing gasket 487. The upper end of cap 485 terminates in a screw threaded pipe nipple 489 to which an electrolyte supply line from a pressure pump (not shown in this figure) is to be connected. A central aperture 491 through nipple 489 is arranged to admit electrolyte to the central chamber 483.

Body 481 has a cylindrical opening 493 at one end which is slightly larger than the largest electrode carrier shank which is to be used. Within the central chamber 483 of body 481 there is positioned a bushing 495 of Teflon or other similar material. This bushing may conveniently fit finger tight within body 481 and should be substantially liquid tight therein but without being so tight in the chamber as to prevent easy removal when changing sizes of the electrode carrier.

The bushing 495 has a plurality of annular grooves 497 the purpose of which is to prevent excessive bypass leakage around the shank 499 of electrode carrier 501, which is arranged to slide freely in the bushing. Where the tip of the electrode 503 is round, the shank 499 may be round, and the bore of bushing 495 likewise. But where the tip is of some irregular shape, the shank requires a key to be machined on one side, and the opening in the bushing is provided with a matching key slot to prevent accidental rotation of the electrode. Other antirotation expedients may of course be substituted, such as a simple guide for the portion of the tool carrier beyond the cylinder.

The electrode tip must have an area (measured to its extreme perimeter) which is slightly larger than the effective cross sectional area of the shank 499. The electrode tip is made in the manner previously described, and the electrode above the tip is coated with ceramic as previously discussed and at its upper end it is secured to the lower end of the shank 499.

A passage 509 for electrolyte is provided through the central portion of electrode 503, its shape and size being suited to the electrode tip shape. If the tip is round, square, or hexagonal, for example, the passage may be round. If the tip is of crescent shape (to form interblade spaces for a turbine wheel, for instance), then the passage may be of some more convenient shape.

This passage through the electrode communicates by way of a passage 511 through the shank 499 of the electrode holder with the chamber 483 and the flow rate or pressure drop through the passage 511 is adjusted by a conveniently located needle valve 513.

A flexible electrical connection 515 leads from the body to the electrode holder 501 where it is secured by a terminal 517 and terminal screw 519.

A direct current power source is then connected between the lead 515 and the holder 521 for the work W, the positive connection going to the work or the vise or fixture therefor.

The complete electrode drive assembly is then mounted by any suitable means to bring the electrode 503 in working relationship to the work, and the work is held by a vise or clamp or fixture. The work area is then enclosed, preferably by movable screens or curtains of transparent material, so that it is easy to see and have access to the work area while still being protected from the considerable splatter of electrolyte during operation.

The electrolyte pressure source should, for convenience, provide, adjustably, from 50 to 200 p.s.i. of electrolyte pressure, and the work area should be cupped and drained so that electrolyte is returned to the supply tank. This arrangement is adequately shown in other figures and is believed clear enough as not to require repetition in this drawing.

In operation, the work is positioned such that the electrode tip is near the work surface with the electrode in the retracted position.

Electrolyte pressure is then turned on, and as the liquid enters the chamber 483 in body 481, it forces the electrode holder shank 499 outwardly toward the work as the shank 499 acts as a piston. But as the tip of electrode 503 almost engages the face of the work, a hydrostatic pressure is built up between the tip and the work face, and this pressure produces a force tending to push the electrode away from the work. Since the area of the tip was deliberately made greater than the effective cross sectional area of the shank 499, the tip can never touch the work face in such a manner as to seal off the flow entirely, for as the tip moves closer and closer to work, the flow of liquid is pinched off so that liquid pressure between the tip and the work approaches the pressure in the chamber 483, acting upon shank 499 as a piston. But, before the liquid pressure under the electrode tip equals the pressure in the chamebr 483, the force acting upwardly against the tip equals the force acting outwardly on shank 499, and an equilibrium position is reached with the tip in very close proximity to the work but not touching it.

At this point, the electrolytic current supply is turned on, and the full coaction of all the elements—pressure pump, electric power source, electrode tip, electrode shank, etc.—comes into play. Through electrolytic action, material is removed from the work under the electrode tip. This increases the space between the work and the tip, and the hydrostatic pressure at the tip tends to fall, but the instant this work gap pressure falls, the hydraulic force on the shank 499 exceeds the upward force on the tip, and so pressure generated by the pump moves the electrode downwardly to a new equilibrium point. This occurs as a continuous motion, thereby maintaining a desirably small work gap to maximize the electric current which can be passed at a reasonable and modest voltage.

The orifice constituted by the needle valve 513 in the passage 511 through the electrode shank permits fine adjustment of the work gap distance, and this is desirable because in practice it is not easy to maintain an exact area of the electrode tip, particularly if it is of an irregular shape. By reducing the needle valve opening so as to impede electrolyte flow through the electrode, the tip must move closer to the work in order to develop a back pressure sufficient to exert an upward force on the tip equal to the downward force on the shank. Thus, reducing the needle valve opening results in closer work gap spacing, while opening it has the opposite effect. This eliminates what might be a troublesome problem, namely the balancing of areas of tip and shank to secure just the work gap desired. All that is needed is that the tip area, whatever its shape, be a little larger than the cross sectional area of the shank, and the needle valve will permit the rest of the adjusting.

Adjustment may also be accomplished by changing the applied electrolyte pressure. At lower pressure, a smaller work gap will result and vice versa. While this might be relied upon alone in a very low cost embodiment of the apparatus, it could introduce some problems, as changes in pressure may affect electrolyte temperature and gassing in the work gap, thereby affecting size, finish, etc. In most cases, therefore, it is better to select a more or less fixd working pressure and to make adjustments in other ways such as with the needle valve 513.

This form of the invention (FIG. 51) permits construction of very low cost apparatus, and may have special value in the extraction of broken taps. A range of sizes of electrodes and matching insulating bushings 495 is provided for ready interchange. One great advantage of this system (as is also true of the other forms of the invention) is the fact that there is very little, if any, wear or erosion of the electrode, whereas in the so-called "tap busters" of the prior art in which there is arcing between the electrode and the work, the electrode is worn away at a substantial rate and is a substantial factor in overall cost.

FIGS. 3, 4 and 10 illustrate a form of electrode for making simple cavities. The electrode generally designated by reference number 31 may be made of a copper body 275, although stainless steel or titanium are better for most purposes since they have less tendency to acquire plating deposits. It has a central passage 277 and, at the working tip 279, is a flange or laterally extending lip 281. In practice, this lip may project beyond the body 275 by about .010 inch to .030 inch or more. In the axial direction, the thickness of the lip may be from .010 inch to .030 inch or more, but I prefer to make it about .020 inch to .030 inch. The lip may taper in thickness so as to have a much thicker section near the body and quite a narrow section at its extremity. The purpose in keeping the lip thin is to minimize the area exposed in such a way as to minimize side action; that is, the removal of material from the sides of the cavity as the electrode penetrates the work.

Some amount of side action seems unavoidable, but the use of a narrow edged lip holds this to a minimum value, and, moreover, helps to keep the amount of side action fairly uniform so that the side walls of the cavity can be kept straight and so that cavities of the same size can be produced repetitively. I find that side action can be easily held to about .005 inch (.010 inch on the diameter) and reproducibility can be held to within a few thousands of the given dimension. Accuracy is dependent not only upon the electrode but on holding a constant feed rate, constant electrical voltage, and constant temperature of electrolyte. A cooled heat exchanger may be installed in the electrolyte tank to hold the electrolyte down to a predetermined temperature. Pumping against a bypass restriction will have the effect of raising the electrolyte temperature appreciably. Additionally, immersion heaters with thermostatic control and other well known expedients may be used to maintain the desired temperature which, for good chemical reactivity, is preferably within the range of 120° F. to 160° F. at the input to the electrode.

The body 275 of the electrode is coated with a ceramic or vitreous enamel layer 283 which is better for this purpose than any organic coating I have found. For this purpose I have used ceramic oxide frits of the kind commonly used for decorative enameled jewelry, or the kind used for protection of electrical resistors of the heavy duty type. The frit is mixed with water and ager to make a creamy suspension which is applied to the electrode body with a spray gun. Then the electrode is placed in an oven or kiln and fired to 1500° F. to 1800° F. or whatever is required to fuse the particular frit being used. The enamel layer 283 which is thus formed should be free of discontinuities, and it may be necessary to apply one or more additional layers to insure this. The coating should be reasonably uniform in thickness and should not extend sidewardly beyond the projection of lip 281, for if it has humps which extend too far, they will bump the side wall of the cavity as the electrode advances and deflect the electrode sideways, which may produce a crooked hole or cause the lip 281 to strike the side wall of the cavity, causing a short circuit and arcing with consequent possibility of damage both to the electrode and to the work.

The purpose of the enamel coating is to utilize its insulating properties to minimize electrolytic side action between the electrode body and the side walls of the cavity. In some instances, however, where the lip 281 extends a substantial distance, this insulation is not required, and very little side action is obserbed without it. The explanation for this is believed to be as follows: When the electrode tip is in close proximity to the frontal working face of the work, the gap for the escape of electrolyte is only a few thousandths of an inch. Thus the electrolyte exiting under the tip under substantial pressure has high velocity as it enters the much larger space behind the tip. With a small amount of electrolyte at high velocity many discontinuities are created so that electrolytic conduction to the side walls is impaired sufficiently to prevent substantial removal of material and, in addition, it is possible to operate at a high enough voltage and current density so that electrolyte in the narrow work gap is heated above its normal input temperature, between 120° F. and 160° F., and also some gas is involved.

Within the confines of the work gap, however, the liquid is held under a relatively high pressure of several atmospheres so that its boiling temperature is considerably elevated. I have commonly used electrolyte pressure of the order of 100 p.s.i. gauge. When the liquid passes beyond the lip 281 into the relatively open space behind it, there is, in the first place, not a very high mass flow because of the restriction of the narrow work gap, but the liquid has high velocity because of the pressure and can be observed to foam as it exits. It is conjectured, therefore, that the electrolyte in the space between the body 275 and the wall of the cavity as it exits at high velocity from the work gap becomes almost instantly full of discontinuities due to gas bubbles either from boiling or electrolytic decomposition in the work gap or both so that conductivity from the body 275 to the side wall is quite poor.

Whether or not this is the explanation, the fact is that in cavities up to an inch in depth there does not seem to be much side action when a lip of substantial protrusion is used. Notwithstanding this, it is preferred to use an insulating coating, as the finish on the side walls of the work seems to be better in most cases when this is done.

Vitreous enamel is the best coating I have found, but other insulating materials may be used. I have found Teflon quite satisfactory where it can be easily applied. However, the organic lacquers and paints which have been tested have not been very satisfactory because they seem to be chemically or physically attacked near the working tip. The vitreous enamle seems to be quite impervious to such deterioration.

Copper is a good substance for forming the electrode because it is a good electrical conductor, but good success has been had with cold rolled steel. Brass may be used, but it is difficult to get a good vitrified enamle coating on brass, and accordingly, it is not preferred. All of these materials are, in general, somewhat less satisfactory than stainless steel or titanium in that they are susceptible to the formation of plating deposits which, under some conditions, may make the outline of the electrode less clean, and in some instances such deposits may change the current flow characteristics of the system.

Where it is desired to sink a cavity at an angle—as, for example, in making rectangular slots through a piece of work material at an oblique angle—it is necessary to modify the working tip of the simple electrode as shown in FIG. 12. The tip 279 is secured to the electrode shank or body 275 at an angle so that the end face lies flat against the starting surface so as to cause electrolyte to exit relatively equally in all directions. If the surface of the work is irregular so that good initial contact cannot be achieved, reversing the current for a short period so as to deplate the electrode into uniform contact with the work will result in an effective seal.

Whenever an electrode of the type shown in FIGS. 3, 4, 10, or 11, for example, breaks through the remote side of a workpiece, there may be difficulty if the remote side is not precisely parallel to the plane of the electrode tip. In fact, this is true of any electrode used for piercing a through hole. The difficulty is threefold.

First, if the breakthrough occurs at one place before another—which is more likely than otherwise—the electrolyte will tend to flow out through the opening thus created, and when the first opening is large enough, all of the electrolyte will exit through it and none will be present between the unpierced portion of the work and its opposing portion of the electrode tip. Accordingly, if the electrode is advanced further toward the work, it will make mechanical contact and cause short circuiting.

Second, if the feed mechanism is of the type controlled by hydrostatic pressure in the electrolyte supply line or by electric current in the electrolytic work circuit, the initial breakthrough will cause a drop in electrolyte pressure at the electrode and in electric current, and the result will be that the feed rate will be increased by the false signal, and this too will cause short circuiting.

Third, in hole piercing operations it is common to use a simple, thin wall, hollow eectrode and to allow a projection 285 of the work material to remain within the electrode, as shown in FIGS. 13, 14, and 15 for instance, and where the hole is not large, it is common not to insulate the interior wall of the electrode; although where the electrode is large, this is done (as shown at 287 in FIG. 11) to reduce current consumption. It is also done where it is desired by a trepanning operation to form an accurate, untapered shape on the work within the electrode, this portion thereby becoming the finished workpiece or an integral portion thereof.

If no preventive measures are taken, this projection 285 may cock to one side when the electrode breaks through the remote side of the workpiece. This occurs where the breakthrough occurs almost simultaneously around the perimeter of the electrode tip but still leaves one thin and small point of attachment weak enough to bend and allow the projection within the electrode to swing over and make contact with the inner wall of the electrode, thus causing a short circuit and causing a burn off through the small, thin, remaining area of attachment.

To overcome these difficulties, a dummy workpiece 289 (see FIGS. 13, 14, and 15) is fastened on the remote surface of the workpiece W by gluing with a water soluble glue. Waterglass (sodium silicate solution) is inexpensive and has been found suitable for the purpose. As a precaution, the dummy workpiece is mechanically clamped as by the C-clamp 291 shown in the drawings. As the electrode 31 advances from the position shown in FIG. 13 through the workpiece proper, as shown in FIG. 14, it exposes and the electrolyte dissolves the glue beneath the edge of the electrode so that the electrode penetrates into the dummy workpiece as shown, but the projection 285 within the electrode remains glued to the dummy workpiece 289. Penetration of the electrode into the dummy workpiece should be carried far enough to assure straight side walls of the cavity in the work, but should not be prolonged unduly as the glue holding the projection 285 to the dummy workpiece will gradually dissolve and release the projection which then rattles around within the electrode, causing intermittent short circuiting. While this does not harm the work, it does roughen and erode the wall of the electrode and should be avoided.

A variant arrangement somewhat easier to apply is shown in FIG. 15. A plastic sponge 293 is held by support member 295 against the remote side of the workpiece W. The support member may be held by C-clamps 291, as shown, or in any other suitable manner. The sponge should be thick enough and resilient enough to permit the working tip of electrode 31 to be pressed down into it as it passes through the workpiece. Yet it must be firm enough to offer resistance to the passage of liquid through it. Thus, if upon breakthrough, an opening occurs at one point before another, there is no free exit of electrolyte, and the remainder of the electrode tip continues to be supplied with electrolyte so that all of the necessary material is removed electrolyticaly, thus providing a clean and sharp opening. The one negative aspect of this variant is that, if the electrode penetrates too far or for too long a time beyond the workpiece, there may be some unwanted electrolytic action between the electrode tip and the face of the remote side of the workpiece. This may be minimized by going only as far as needed for a clean breakthrough, but it is avoided almost entirely by the arrangement and procedure of FIGS. 13 and 14.

Any other sufficiently resilient material, such as soft rubber for instance, may be used in place of the sponge 293 so long as it provides a seal and permits slight electrode penetration.

In lieu of backing the work material either with a metal plate or a soft, resilient material, it is possible also to provide at the back or exit side of the workpiece a closed chamber which is completely filled with electrolyte. When this is done, then, as the electrode first breaks through the workpiece, the electrolyte which would otherwise tend to flow entirely through the first opening cannot do this because the chamber backing the workpiece is already full of electrolyte. Accordingly, there is no low resistance path for discharge of electrolyte. Instead, the electrolyte must continue to flow under the tip of the electrode between the electrode and the workpiece, returning along the electrode as was the case during the portions of the "cut" prior to initial breakthrough. This alternative method of securing a clean breakthrough is of particular advantage where the workpiece is of such configuration that it is not easy to gain access to the back or exit side as, for example, when the workpiece is itself a closed or substantially closed vessel.

Where the workpiece constitutes the shell of an enclosure, then all of the openings in it may be closed or plugged in some suitable manner and the cavity completely filled with electrolyte. Where this is done, it is preferable that the electrode be mounted in such a way relative to the workpiece that the hole or cavity to be made is not at the highest point of the workpiece, for there may be difficulty in assuring against bubbles in this area. It is preferable, therefore, to arrange the work and the electrode so that the hole to be made is in a position well below the highest point of the work, while at the same time taking care to fill the cavity as nearly completely as possible to avoid the resilience of excessive pockets of air or other gaseous material.

In FIG. 16, another variant of the electrode is shown. Here the tip 297 is made of tantalum and is fastened by welding, brazing, or swaging to the electrode body 275, which may be made of any suitable less costly material. The special utility of the tantalum tip is that it permits the use of an alternating current electrical supply system, readily and cheaply available without rectification. All that is needed is simple stepdown transformer. If an acidic electrolyte is used, the tantalum will pass current when it is a cathode (—) but not when it is an anode (+). Thus, current will pass in a direction suitable for removing work material but will not pass in a direction to attack the electrode.

The inner and outer walls of the body 275 are coated with ceramic 283 or other insulating material so that they will not be attacked by reverse electrolytic action. The tantalum electrode permits a very inexpensive apparatus although, since it works only on the half cycle, it removal rate is not as great as that of the direct current system. However, where a large number of cavities is to be made simultaneously, a plurality of tantalum tipped electrodes may be used, and where the workpieces are separate, the alternating current electrical connections are so made that half of the electrolytic work cells are connected in one sense and the other half in the reverse sense, so that both halves of the alternating current cycle are substantially equal loaded.

Other tip materials may be used for other purposes. Thus, the tip may be plated with black platinum to increase its effective electrical area to diminish cathode losses. Tungsten or silver tungsten may be used to minimize electrode damage from accidental short circuiting. Silver may be used where its higher conductivity will be helpful, particularly where the electrode is small and necessarily has thin sections which might offer substantial electrical resistance if made of poor conductors, such as stainless steel or steel, and where even copper might tend to be heated excessively.

Referring to FIG. 17, there is shown a simple apparatus used to impart a high spectral finish to the walls of the cavity. Around he electrode 31 there are placed one or more synthetic rubber gaskets 299, such as the two O rings shown. These are soft enough to seal against the face of the work W and are formed to fit closely the contour of electrode 31. A clamp plate 301 is mounted to a pedestal 303 at one end and has a clearance opening 305 to surround the electrode at its opposite end. A stud 307 passes through a central clearance hole in the clamping plate and is fitted with a wing nut 309 by which the clamping plate 301 may be bent downwardly to clamp and compress the gaskets 299 so that they seal against both the face of the work W and the body of the electrode 31. The clamping pressure is adjusted to permit escape of electrolyte which is pumped through the bore of the electrode at a pressure of say 100 p.s.i., but yet holding the electrolyte under some pressure after it passes the lip of the electrode. The electrode is insulated by enamel, as previously described, and is advanced into the cavity, preferably by a positive mechanical drive which is not influenced in its rate of advance by the friction of the seal.

Under these conditions with most electrolytes suitable for the particular work material involved, the side walls of the cavity show a bright, lustrous finish characteristic of electropolishing. This is quite surprising, for the generally accepted theory of electropolishing presupposes a stagnant viscous layer of complex salts of the work material lying in the low areas and insulating these while the high points are removed. Yet, here, high velocities and great turbulence are purposely encouraged and produce the desired result with great rapidity even though this appears to be operating counter to accepted theory.

As a typical example, a cavity was sunk in a piece of super-alloy material AMS 5537, sometimes designated L605 or Stellite 25. Its composition is given as follows:

20% Cr, 10% Ni, 15% W, balance Co

Electrolyte consisted of the following in 15 gallons of tap water:

| | Oz. |
|---|---|
| Potassium nitrate | 23.3 |
| Rochelle salt | 13.3 |
| Sodium nitrite | 18.6 |
| Potassium chloride | 28.0 |
| Calgon Banox | 4.8 |

Another surprising aspect of this process is that it has been said by scholars and experimenters in the electropolishing field that complex alloys cannot be successfully electropolished. Obviously, this material is of just the kind which has generally been thought unsuitable.

It is believed that the electropolishing action may be caused by relatively high velocities and pressure over the work surface. The high velocities may tend to reduce the polarizing or passive film which is always tending to form on the anode at high current densities. But this reduction in thickness of the anodic film is much more marked on any protuberance or minute point of the surface and much less marked at any depressed portion, thus tending to attack the high points more rapidly. It has been proposed to use rotating discs as cathodes, but there are severe limitations on the practical usability of this means of attaining high velocity in the electrolyte. For example, many irregular shapes of work can scarcely be approached to a rotating member in a uniform manner. But, so far as I am aware, the use of high pressure pumping to attain high velocities for electropolishing is new. With the high velocity, the use of pressure of several atmospheres permits operating at current densities which might cause excessive gassing and even boiling which, of course, prevents good polishing. So far as I am aware, it is new to use high pressure in an electrolyzing system to permit attainment of high current densities either for electropolishing or for rapid mass metal removal.

Referring back to FIGS. 3, 5, and 6, previously mentioned, there are shown in end view three variations of contouring electrodes for rough forming interblade spaces of turbine wheels of the integral blade type. Each view shows a cylindrical electrode mount 211 and a formed lip 281 shaped to the desired outline. The tube body of the electrode 31 is hidden behind the end portion, and the dotted lines which would indicate its position have been omitted to avoid confusion. Suffice it to say that the tubes 275 are formed to the general shape of the desired contour but reduced in dimension so that all parts of the tube lie within the outline of the outer edge of the lip 281, as previously explained. The exterior of the tube, at least, is preferably coated with insulating material 283 such as vitreous enamel.

In FIGS. 3 and 4, the opening 277 in the tube appears as a single, curved slot and ordinarily this is what is used if speed of removal of work material is the primary consideration. A copper tube is rough-shaped to the desired contour; then the lip 281 is made by peening or swaging the end of the tube in a die. Then the lip is filed accurately to the desired shape. The opening in the tube is carefully faired out by filing to make the width of the lip as nearly uniform as possible and preferably not more than 1/16 inch to 1/8 inch wide from the faired opening to the extremity of the lip.

15

The electrode of FIG. 3 will leave a ridge of work material extending up into the slot opening. If desired, this may be eliminated by brazing a thin copper bottom plate 317 to the working tip as is illustrated in FIGS. 5, 6, and 7. This plate has numerous small holes 319 about .030 inch in diameter as in FIG. 6, or fewer larger holes as in FIG. 5, and serves to remove work material electrolytically which would otherwise extend up into the tube. The bottom plate is shaped to the shape of the lip. No holes are in the edge areas of the bottom plate as these might cause an irregular flow pattern and consequent channeling in the work.

Instead of a copper bottom plate with holes, it is also within the purview of the invention to use a porous metal element 321 shaped to fit snugly within the slot of the electrode as shown in FIG. 18. Or a formed metal screen element may be inserted in this manner. The central idea is to place a metallic electrode surface across the open slot, leaving a small pattern for the passage of liquid but eliminating any large open area. It is best, however, if the central portion of the electrode is recessed somewhat so as to be behind the electrode end as is best seen in FIG. 7.

FIG. 18, previously referred to, shows in section an electrode end in which the porous metal member 321 has been fastened by rolling the tube body 275 into an annular groove 322 in the porous metal element, which is also shaped to form the working lip 281. Ceramic coating 283 is then applied to the exterior of the electrode.

This electrode is suitable for small areas, but I have found that when the diameter of a porous metal type of electrode tip is as large as 1 inch, the work is left with radially extending grooves probably caused by liquid exiting irregularly from the mid-area of the tip. The path from the point of introduction of electrolyte to the point where it leaves the active work area should preferably be kept short, and I prefer to keep this distance under ⅛ inch to ¼ inch.

It is a part of the inventive idea to give attention to means for allowing the electrolyte to escape without first traveling a long distance in the electrolytic field between the electrode and the work. A number of means of doing this with consequent opportunity for performing very useful and unique work is illustrated in the following exposition of several different types of shaping electrodes. The purpose, in part, is to permit not only the formation of cavities of a desired cross sectional shape, but also the formation of cavities having shaped compound contours in three dimension, as for example, in producing a forging die.

Referring to FIGS. 19 to 24, there are shown perspective and sectional views of an electrode with minor variations for sinking cavities having irregularly shaped bottom and/or side wall surfaces.

Into a metallic header 323 are drilled a multiplicity of holes arranged in a regular pattern, as shown in the fragmentary header layout drawings of FIG. 22 or 23. Then metal tubes 325 are fitted into the header holes, and their inner ends are expanded slightly by a tapered tool or brazed or otherwise secured to seat, seal, and lock the tubes in the header. The tubes may be straight or, optionally, they may be enlarged at their working ends as shown at 327. The enlargement may be accomplished by electroplating—for example, with copper or nickel—to a depth of, say, .005 inch to .010 inch or more. The purpose is to permit close spacing of tubes 325 at their working ends without making it too difficult to fabricate header 323 by requiring exceedingly thin walls between the holes for the tubes. The tube bundle may be made by copper plating stainless steel tubes; then nesting them together and soldering them into the header 323 at one end, and thereafter dipping the working end in nitric acid to eat away the copper and leave the stainless steel so that there is space between the tubes at the working end for exit of electrolyte.

16

For rough work the tubes may be about ¹⁄₁₆ inch in diameter and should have centre bores about .030 inch for the passage of electrolyte. The spacing between tubes should not exceed ¹⁄₆₄ inch, and this close spacing may be brought about either by close spacing of the header holes or by enlarging the working ends of the tubes and using somewhat more generous spacing of the header holes. To minimize pattern in the work I prefer needles of about .025 inch outside diameter with .010 inch bore and about .010 inch spacing.

A chamber 331 is formed in the header 323 for introducing electrolyte into the tubes, and a cover plate 333 is fastened by bolts 334 to the header. In the cover plate is a centrally located opening threaded to receive a pipe fitting 335 at the end of a rigid supply tube 337, which also serves for mounting the electrode in a feed device, for example, like that of FIG. 1. An electric cable (not shown) brings the negative electrical connection to the header and is conveniently fastened under one of the bolts 334 holding the cover plate 333 to the header 323.

In FIGS. 19, 21, and 24 there is shown a compound contour at the working end of the tubes 325. This may be shaped by a variety of mechanical means, if so desired. For example, the individual tubes 325 may be precut to the appropriate lengths before being inserted and fastened in header 323.

I prefer, however, to use a process which I believe to be unique to impart the desired shape into the electrode. A master form is made with a shape which is a negative of the shape desired in the electrode. This may be made of metal or it may be of plastic or plaster with a conductive metal coating. The master form is mounted in the place where the work is ordinarily mounted, and the polarity of the power source is reversed to that the electrode is an anode.

At this point it should be understood that the tubes 325 may terminate roughly on a plane normal to the tube axes. Their ends do not define any special form.

Now, with electrolyte being pumped through the supply tube 337 and through the tubes 325 the electrode assembly is advanced slowly toward the master form. As any tubes approach the master form, they are anodically reduced, shortening their length to conform to the shape of the master form. When all of the tubes are far enough advanced to be in active electrolytic relationship with the master form—that is, when all have been shortened somewhat by electrolytic attack—the speed of advance of the electrode is increased as much as possible without causing contact with the master form. Then, simultaneously the electrolytic current is turned off, and the advance is stopped. By the fast feed for final forming, each tube is brought within .001 inch of the confronting surface of the master form so that any deviation between the form of the master and the form defined by the tube ends is less than .001 inch.

The master is then replaced by a workpiece—for example, a hardened die block—the polarity of the electrical supply is restored to normal so that the work is the anode, and now the form established by the master can be reproduced in the work.

To do this, the same procedure is followed as in shaping the electrode. The advance of the electrode is held at moderate speed until all tubes are electrolytically removing work material. Then the speed is increased to the maximum attainable without contact with the work. This maximum is determined by the nature of the work material, the electrolyte, its temperature, its pressure, the voltage, the available current supply, etc. As a practical matter, one learns quite quickly what speeds are suitable under practical operating conditions. For this work where high accuracy is desired, it is good to use electrolyte of lower conductivity made, for example, by diluting a high removal solution with water. By reducing the conductivity, the differential in removal rate between the parts of the electrode in close proximity to the work and those more remote is accentuated so that better conformation between electrode and work is obtained.

It has been found practical to make the tubes 325 of 18–8 stainless steel because this material can be reduced very rapidly for shaping the electrode. Also, the removal is even and the surface is smooth.

When the cavity has been formed by this means, the cavity surface will show the pattern of the tubes 325, but only a relatively small amount of material needs to be removed to smooth the surface to acceptable standards if the tubes are small and the tube spacing is close.

It should be observed that the spaces between the tubes provide channels for the exhaust of electrolyte.

If desired, the outside tubes, after the electrode has been shaped, may be coated with ceramic so that the side walls of the cavity will not be unduly attacked and removed electrolytically. For many cavities of this general kind, this is not important, but for some it is.

It should also be noted that for fine detail, or where there are steep contours, finer tubes may be and should be used, and I have successfully used tubes of .020 inch in diameter with .010 inch spacing, and probably even smaller tubes could be used, if necessary, by providing adequate electrolyte pumping pressure and good filtration to prevent clogging of tubes of fine bore.

FIG. 20 shows an electrode similar to that of FIG. 19 as used for forming grooves 328 in the surface of a rotating workpiece. Here the work, a ring W, is held by chuck jaws 330 and rotated upon a spindle 332. The electrode is supported by the electrolyte supply pipe 337 in a tool rest and advanced into the work as the work rotates. Electrolyte at a pressure of 25 to 200 pounds per square inch is pumped through the electrode. It thus cuts a smooth slot in the workpiece periphery.

In general, the electrode illustrated in FIGS. 19 to 24 is suitable for the rapid removal of work material, particularly where the side walls and bottom surface of the cavity produced in the work may be somewhat rough without this being objectionable. Because of the rotation of the work in FIG. 20, the groove formed will, of course, be smooth. When it is desired to produce cavities having a better finish, I prefer to use electrodes constructed generally after the fashion illustrated in FIGS. 25 to 31. The electrode of FIGS. 25 and 26 is essentially similar to the one shown in FIG. 18 in that a piece of porous metal 321 is secured at the working end of a tubular electrode member 275. It is preferable, however, for use in forming cavities of larger size than the electrode illustrated in FIG. 18, since it provides for an escape of the electrolyte from the interface between the electrode tip and the work in much the same way that the electrode escapes from the work through the spaces between the tubes 325 in the electrode of FIGS. 19 and 21 for instance.

The porous metal member 321 is provided with one or more transverse holes 339 which are connected to the working face of the electrode by a plurality of smaller holes 341. The electrolyte, therefore, under pressure within the tube 275 finds its way to the working face of the electrode through the tortuous passages within the porous member 321, and this electrolyte then escapes by way of the small passages 341 to the larger channels 339 which carry the electrolyte away from the work. If it is found that an excessive amount of electrolyte escapes directly into the channel 339, for instance, without reaching the work, these channels can be sealed as by burnishing, for instance, and this treatment may also be given to the smaller passages 341 so that although there may be some leakage directly into these passages, such leakage is a minor consequence. Alternatively these surfaces may be lightly tinned with solder or plated to effect the seal.

The electrode of FIGS. 27 and 28 is made from a single block of metal 343, the end portion of which is shaped to the contour of the hole to be formed. A plurality of holes 345 is drilled through the block, these holes extending longitudinally of the electrode and having their top ends interconnected within a hollow space 347 provided in the upper portion of the block. The diameter of the holes at the exit end should be relatively small, and I have found that a hole size of .030 inch seems best since it neither produces nibs, as do larger holes, nor craters, as do smaller holes. If desired, in order to reduce the pressure drop through the electrode, these openings may be enlarged from the recess 347 down to a position slightly above the working face as is indicated at 349. The lower portion of the block is then slotted as at 351. Although these slots may run in any convenient direction, the practical consideration is that they are to provide channels for the escape of the electrolyte from the working face, and they are therefore shown in the figures as being positioned between each of the holes 345 and intersecting at right angles. It is important that the distance from any hole to the adjacent exit slot be short, not more than three quarters of an inch. Thus the electrode is made up of a plurality of small rectangular electrodes, each of which has a small opening at the centre for supplying electrolyte to the work, with the slots between the individual electrode members providing for the escape of electrolyte after it has traveled only a short distance within the work gap.

The electrode of FIGS. 29, 30, and 31 is generally similar in the overall result produced to the one shown in FIGS. 27 and 28. Here, however, the electrode block 343 has its lower end shaped to the contour of the cavity to be produced and the block is provided with a cavity 347 in its upper portion to receive the electrolyte. This cavity is connected to the working face by a plurality of drilled holes 345 which conduct the electrolyte. Interspersed between these holes are other holes 353 which extend partway up into the block, where their upper ends are connected to transversely extending manifolding passages 355. Preferably, to reduce and tend to equalize the pressure drop for all of the holes 353, the transverse passages 355 are drilled in both directions at right angles to each other, as is illustrated in FIG. 29.

Electrolyte is therefore supplied directly to the working face through the channels 345 and flows over the working face only a very short distance before passing upwardly through an adjacent hole 353 to one of the transverse passages 355 and through this passage to the outside.

All of the electrodes discussed above may be relieved to a shallow depth at their side faces, and this recessed portion may be coated with a ceramic layer which, as previously described in connection with the description of other electrodes, is for the purpose of inhibiting side action as between the electrode and the side walls of the cavity. Furthermore, as previously described, the end face of this and other electrodes may be shaped by deplating; that is, by reversing the current and plating away the end face of the electrode as it approaches a shaped tool which has a contour which is the negative of the contour desired upon the electrode.

FIGS. 32 and 33 show electrodes generally similar to those illustrated in FIGS. 27 and 28, excepting that the individual electrode end faces indicated at 357 are hexagonal rather than rectangular. Each of these end faces is connected to the interior 347 of the electrode by passages 349 which lead to small holes 345 at the working end of the electrode. If desired, and as shown in FIGS. 32 and 33, the hexagonal end faces 357 may be spaced from each other sufficiently so that as the electrode is advanced into the work, a honeycomb formation of ridges remain as an integral portion of the main body of the work. This arrangement is of great utility where it is desired to remove weight, as in aircraft elements and equipment, without appreciably reducing the overall strength of the particular part. If the working tips are brought close enough together (about .010 inch to .015 inch), the honeycomb fin will be eliminated and this arrangement is useful when removing material over a large area since the round stems above the hexagonal faces provide considerable flow capacity for conducting electrolyte away, particularly from the central portion of the electrode. Ordinarily, with large electrodes it is difficult to provide enough exit area at the centre to insure even electrolyte flow throughout the electrode.

The electrode illustrated in FIGS. 34, 35, and 36 has an arrangement generally similar to that of FIGS. 29, 30, and 31 excepting that the working face 359 is at the side of the electrode rather than at the end thereof. This is particularly advantageous where it is necessary to insert the electrode into a space having relatively low clearance above the surface to be worked upon. Thus the electrode of FIG. 34, for instance, can be inserted into a drilled opening or into a rough formed space between turbine blades at the edge of a disc and then moved laterally so as to shape the contour of the face operated against. In this arrangement, a hollow space 361 at one end of the electrode is connected by a plurality of longitudinally extending passages 363 with transversely extending small passages 365 which lead to the working face. Interspersed between the passages 365 is another set of passages 367 which extend straight through the electrode to the back surface thereof so as to provide a means of escape for the electrolyte. If the electrode is to operate within a confined space where the back surface of the electrode may be close to a portion of the cavity where it is desired not to remove metal, it may be advantageous to coat this back surface with ceramic material as previously discussed so as to render this surface electrolytically inert. Such a coating is indicated at 369.

FIGS. 37 and 38 illustrate another form of electrode generally similar to the one forming the subject matter of FIGS. 34, 35 and 36 excepting that the electrode is quite thin and is supported at both ends by mounting tabs 371. These tabs may be clamped in a suitable fixture so as to bring the working face 373 against the surface to be finished. This type of electrode is particularly suitable where the clearances are small, as between turbine blades, for instance, which have been rough finished by an electrode of the type illustrated in FIGS. 3, 5, and 6.

As with the previous electrodes of this general character, a multiplicity of holes 375 communicate between the working face and channels 377 which extend relatively parallel to the working face. These channels are connected at one or both ends to a manifold 378, the manifold in turn being connected to a source of electrolyte under pressure. Between the holes 375 other holes 379 extend through the electrode from the working face to the back surface thereof so as to provide a means for escape of the electrolyte. As with the other electrodes, the working face of the electrode of FIGS. 37 and 38 may be shaped to the precise working contour by reversing the direction of current supply thereto, and bringing this working face against a master tool so as to deplate the working face of the electrode to the precise desired contour.

One of the advantages of shaping the working face or end of the electrode by electrolytic action is illustrated in FIGS. 39, 40, 41 and 42. In FIG. 39 the tool is indicated generally at 381. This tool may be considered as having a conical nose 383 which is to be used in shaping a cavity. This nose, however, will not shape a precisely conical hole since the electrolytic action is greatest at the sharp point indicated at 385. Thus the cavity produced in the work will appear much as that shown in the block 387 immediately therebelow. In this representation it will be noted that the sides of the cavity throughout the major portion of the surface have a conical contour which conforms to the face 383, this conical surface being indicated at 389, but that the extreme bottom center of the cavity will be deepened as indicated at 391. Although it would, of course, be possible to calculate and mechanically modify the end of the electrode 381 so as to avoid this, it is far easier to provide a shaping tool 393 having a conical cavity 395 therein.

If the current is now connected in a reverse direction and the electrode 381 is advanced into this cavity, it will be found that the end of the electrode will be shaped to conical contour, excepting that the extreme end at 397 will be rounded because of the greater electrolytic action at this position. After being so shaped, the conical electrode at 381 with the slightly rounded extreme end can then be used to shape cavities which will be a much closer approximation to the desired truly conical surface.

The same general situation is illustrated in FIGS. 41 and 42 which relate to the shaping of the edge contour of an electrode. As as example, if it is desired to form an electrode of the type shown in FIGS. 32 and 33, and if the hexagonal end surfaces 357 have sharp corners, a cavity much like that indicated at 399 will be produced in which each of the corners of the cavity will have a slight outwardly extending radius as at 401, somewhat exaggerated in this view for the purpose of illustration. On the other hand, if the roughly formed electrode is advanced into cavities of the type illustrated in FIG. 42 at 403, such that these cavities have the desired sharp corners 405 with the current reversed so as to deplate the electrode, the result will be to remove slightly more metal from the corners of the electrode so that these corners are slightly rounded, much as they appear at 407. This electrode can then be used in sinking a cavity in the workpiece with the result that the cavity will be truly hexagonal with sharp corners. In fact if the electrode is of a material having electrochemical characteristics like that of the work, then if the electrode is shaped under working conditions as to voltage, speed, electrolyte temperature and pressure, etc., then the deviations in the electrode from the master will approximate extremely closely the needed compensations to produce the desired shape in the work. Thus it will be appreciated that although under some conditions where relatively sharp corners and points are involved, the electrode shapes a cavity differing somewhat from the contour of the electrode; this problem may be easily overcome by shaping the tip of the electrode by a deplating operation in conjunction with a surface which has the contour it is desired to reproduce in the work.

Figure 44:
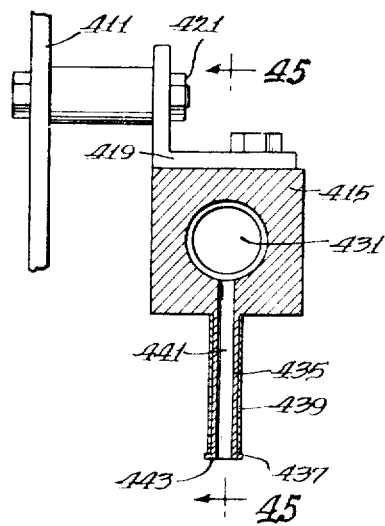
FIG. 44 is a vertical sectional view through the electrode of FIG. 43 taken along the line 44—44 of FIG. 43, looking in the direction of the arrows.
Figure 45:
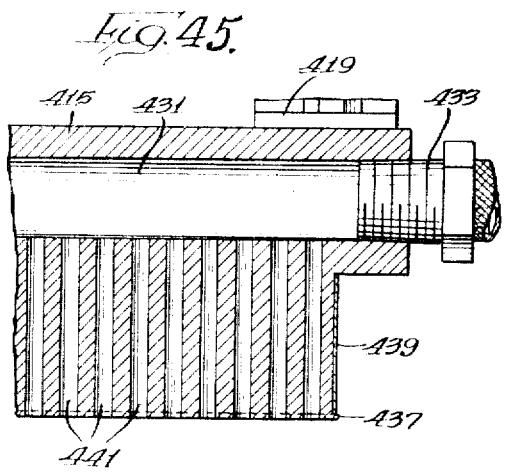
FIG. 45 is a fragmentary longitudinal sectional view taken along the line 45—45 of FIG. 44, looking in the direction of the arrows.

In FIGS. 43, 44 and 45, I have shown an adaptation of my invention for the purpose of providing slots, much of the type usually accomplished by milling. In FIG. 43, the work W is supported so as to move horizontally along machine ways 409. A pair of uprights 411 are rigidly secured to the frame of the machine, and these uprights are vertically slotted as at 413. The electrode, indicated at 415, is provided at one end with an angle bracket 419 connected to one of the uprights 411 by means of a clamping screw 421 which extends through the angle bracket and through the appropriate slot 413. Thus, by loosening this screw, the right hand end of the electrode (as seen in FIG. 43) may be moved upwardly or downwardly as desired, and the electrode may be tilted with the screw serving as a pivot. At the opposite end the electrode 415 has a similar angle bracket 423 connected by a screw 425 to a link 427 connected at its opposite end by a screw 429 to the left hand upright 411, the clamping screw 429 passing through the slot 413 therein.

As seen in FIGS. 44 and 45, the electrode consists of a block having a passage 431 extending longitudinally therethrough. One end of this passage is connected by an appropriate fitting 433 to an electrolyte supply hose. A portion of the block 415 extends downwardly and is milled off at each side so as to provide a thin extension 435 which is slightly wider at the lower end as indicated at 437. The side walls of the extension 435 may be coated, as previously described, with a ceramic layer 439. A plurality of holes 441 are drilled upwardly through the extension 439 from the working face 443 into the passage 431. Electrolyte is therefore supplied by way of the hose fitting 433 to the passage 431 and thence downwardly to the working face through the drilled holes 441. From the working face it is removed by an air blast from appropriately placed nozzles 445, a plurality of which will ordinarily be used. This minimizes unwanted electrolytic erosion except very close to the electrode and is important for holding sharp and accurate edges, etc.

As shown in FIG. 43, the apparatus is set up with the electrode tilted somewhat so that the left hand end of the electrode slightly clears the work W as the work is advanced toward the electrode, whereas the right hand end of the electrode is positioned somewhat closer to the table, its lower end being set a few thousandths of an inch above the bottom of the slot it is intended to cut in the work. With the electrolyte flowing and the electric power turned on, the work is slowly advanced toward the electrode, and as it reaches a portion a few thousandths of an inch spaced therefrom, the electrolytic action will begin to deplate the work, and this will continue as the work advances so that when it passes the opposite end of the electrode the slot will be cut to its full depth.

The holes 441 should be small enough and the rate of supply of electrolyte great enough to insure against a failure of electrolyte pressure at any of the holes when most of the working surface of the electrode is exposed in a position remote from the work. Alternatively, flow through the individual holes may be individually controlled.

The same general scheme is illustrated in FIGS. 46, 47, 48 and 49 excepting that the electrode 447, instead of being contoured to cut a slot in the work W, is rather of a considerable width, as is best indicated in FIGS. 47 and 48 and has its lower edge irregularly contoured so that, as shown, it produces serrations in the face of the work. The arrangement and the electrode may be considered as essentially similar to the one shown in FIGS. 43 and 45, excepting that the electrode is wider and instead of having a single row of holes 441 leading through the electrode from the working surface to the longitudinally extending passage 431, it has several rows of such holes as is indicated at 449. These rows of holes should be staggered much as shown so as to prevent striation of the work. Additionally, instead of being flat, the lower or working face is irregularly contoured transversely, and as will be seen in FIGS. 47 and 48, the serrations should be tapered so that as the electrode advances downwardly into the work, it also, in effect, moves transversely into the work. If this is not done, the grooves formed in the work will be wider than they should be because of the electrolytic side action when the proper depth is achieved. An appropriate taper may be formed by milling the slots in the tool face at a slight angle toward one side and then remilling the slots at a slight angle toward the other side. This produces a slot in the electrode which is true at the end where the work is to leave the electrode, but which is wider at the entering end. As the electrode advances into the work, the ridge portions therefor move downwardly and sidewardly simultaneously.

In any event, regardless of the manner of forming the serrations 451, the tool is placed in a slightly inclined position as is best illustrated in FIG. 46, and the work W traversed beneath the tool slowly so that as it emerges at the right hand end, it bears the serrated surface provided in the working face of the electrode. It will be appreciated that this arangement is not limited to simple serrations, but that variations may be made in the contour of the working face of the electrode and that the electrode will produce a negative of the contour of the electrode in the workpiece as the work is traversed beneath the electrode. In the tool shown in FIGS. 46 to 49, because of its width, it is desirable to provide transverse saw slots 453 between each set of electrolyte supply passages 449.

FIG. 50 shows a simple arrangement for adapting the present process for such applications as deburring the ends of coil compression springs and similar articles. It will be understood that after coil compression springs— such as internal combustion engine valve springs, for instance—are manufactured and the ends ground flat, there is always a burr or feather edge which comes about as a result of the grinding operation. This burr or feather edge is comparatively expensive to remove, particularly from the inside edge. The arrangement and fixture illustrated in FIG. 50, however, accomplish this in an expeditious fashion as follows. The bed 455 of the fixture has a plurality of threaded sockets 457 therein, each of these sockets being connected by a passage 459 to a hose 461 which supplies electrolyte. The base 455 is also connected by a terminal 463 to the positive side of an electrolyzing current supply. A work holder 465 is threaded into each of the sockets 457 and has a recess 467 therein to contain a spring 469 to be deburred. This spring is retained in position in the present example by a cone-pointed set screw 471. This set screw secures the spring 469 in position with its lower end against the bottom of the recess 467 while its upper end is slightly below the top of the recess 467. A generally conical electrode 473 is positioned with its pointed end within the upper end of the spring 469 but so that it does not quite touch the spring. This electrode is threaded into a support member 475 and is connected to the negative side of the power supply as exemplified by the terminal 477. The electrode 473 must, of course, be insulated from the side of the power line represented by the work holder 465, and, as shown, this is accomplished by forming the member 475 of insulating material, and, for convenience, this member is hinged as at 479 to the base portion 455.

Thus the group of electrodes 473 and their support member 475 may be tilted backward about the hinge 479 so as to enable springs to be removed from the sockets 467 and replaced by a new set of springs to be finished. Thereafter the electrodes 473 are tilted to the position shown in close adjacency to the upper ends of the springs 469 after which the electrolyte flow is established and the electrolyzing current turned on. The action is to deplate the upper ends of the springs 469, and of course if this action is carried forward only for a short period of time, this deplating action will have the effect of removing the burr at the ends of the springs so as to give a smooth finished contour to the article without removing appreciable material from the main portion of the springs.

From the above description of my invention which has been illustrated in several embodiments and variations, the features and applications of the inventive idea to practical problems have been discussed. From this it will be apparent that certain generalizations may be made.

The amount of metal removed from a workpiece by electrolytic action is a direct function of the current in the electrolyzing circuit. The voltage necessary to pass any particular current with any particular set of circumstances will depend upon the spacing between the electrode and the workpiece. It will also depend upon the electrode size or effective area, but for a particular job the electrode size usually will not be a variable.

The cost of operation will vary rather directly with the wattage—that is, the amperage in the circuit times the voltage necessary to produce the current. From these considerations it follows that from the practical standpoint it is essential that the electrode to workpiece spacing be held to a practical minimum so that minimum voltages may be used, thereby enabling the operation to be conducted at minimum cost. As an example, by following the teachings of the present invention, precisely held small spacings may be used and most electrolyzing operations may be conducted at approximately ten volts or, in some cases, even less with work gaps from half a thousandth to a few thousandths of an inch. The current densities which appear to be most satisfactory as a practical matter are between 100 and 3000 amperes per square inch of effective electrode area. The wattage, therefore, is between one and thirty kw per square inch. For large areas the voltage may be reduced to four volts while still obtaining reasonable current density.

All prior systems with which I am familiar, which attempt to remove metal by electrolytic action, require far greater total electric energy than this to remove an equivalent amount of metal. Prior workers in this field have found it necessary to use voltages of the order of 100 to 110 volts or more with the result that the energy requirements—or in other words, the cost of removing the metal—are of the order of ten or more times that required when using the invention discussed above. Furthermore, if low voltages are attempted with wide work gaps, the rate of material removal is low and thus more machines are required to produce the same amount of work. It is apparent, therefore, that regardless of the approach to the problem, the accomplishment of high current densities with low voltages is economically essential.

Also, as previously indicated, high voltages together with comparatively large work gap spacings produce an electrolytic action that is far less controllable, and therefore the work produced cannot be as precise as the work produced by using the present invention.

In general, it may be said that simple narrow edged, open ended electrodes of the general character illustrated in FIGS. 3, 4, 8, 9, 10, 11, 12, 13, 14, 15, 16 and 17 will cut the most rapidly. They also leave comparatively regular and smooth side walls, but the centre of the work acted upon is not cut away as rapidly as the work directly beneath the electrode edge since it is much farther from the electrode active surface. This is well illustrated in FIGS. 8, 13, 14 and 15. This electrode, therefore, may be considered as the approved type when it is desired to sink a hole all the way through a workpiece, as in FIGS. 13, 14 or 15, where the small centre piece will fall away, or under some conditions where there is to be a subsequent finishing operation, or where the protuberance at the centre is of no disadvantage. Under some special circumstances this protuberance may even be an advantage, as in FIG. 9, where it is desired subsequently to upset the end of a member in the hole so as to provide a stud firmly anchored to the work, for instance. In general, everything else being equal, rapid sinking of the electrode into the work will give a higher and sharper protuberance than will slow movement of the electrode. This difference may be appreciated by a comparison of FIG. 8 with FIG. 9. In FIG. 8 the electrode is moving rapidly in order to produce a tapered hole having a small diameter at the bottom, whereas in FIG. 9 the electrode is moving slowly so as to produce a reverse taper.

Where it is desired to sink a cavity having a considerable area at the bottom, and where it is desired that the bottom be of generally controlled contour, but under conditions where both the bottom and side walls may be allowed to be somewhat rough, a multiple tube electrode of the type illustrated in FIGS. 19, 21, 22, 23 and 24 is highly satisfactory. A smooth finish with this type electrode may be achieved, however, by using small diameter closely spaced tubes or by producing relative movement between the work and the electrode—in addition to simple advance of the electrode—in such manner as to continually expose the end of the electrode to a shifting work surface for this purpose a vibrator mounted so as to shake the electrode may be used. Another example of this approach is illustrated in FIG. 20. The embodiments of FIGS. 43 to 49 also illustrate this general principle of operation which results in a smooth bottom contour of the surface being worked upon.

If a comparatively high order of precision is required both as to the character of the surface produced upon the work and as to dimensional tolerances, I prefer to use an electrode of the general type of FIGS. 27 to 31. These electrodes, it will be noted, have a comparatively sharp outline, and the end of the electrode which produces the bottom surface has considerable smooth electrode surface in which the individual openings for the supply and removal of the electrolyte are kept relatively small.

For best results, the supply holes should have a diameter of about .030 inch and the distance between the supply and exhaust openings should be kept short.

Air jets may be used, as previously discussed, to prevent unwanted electrolytic action between side surfaces of the electrode and the work, where the electrode is not in close proximity to the work but where electrolyte is caught in stagnant pockets. The air is used to blast away the stagnant electrolyte. The arrangement of FIG. 1 in which the work is positioned above the electrode is also helpful in eliminating stagnant electrolyte pockets as gravity causes the electrolyte to fall away from the work area. This is the case in forming cavities in the work. Where the parts to be produced is a punch or the like so that there is a cavity in the electrode, then the electrode is placed above the work so that gravity helps to clear away the electrolyte except where there is close spacing between the electrode and the work.

A wide variety of electrolytes may be used in the apparatus and processes heretofore described. Some work materials respond to acid solutions of 5% to 25% of the appropriate strong acids such as hydrochloric, nitric and sulphuric. Other materials, such as cemented carbides— e.g., tungsten, tungsten carbide, titanium carbide, etc.— respond better to caustic solutions such as a 20% solution of potassium hydroxide to which may be added 5% sodium tungstate.

To the extent possible without excessive loss of removal rates, it is preferable to use neutral or nearly neutral salt solutions because they are much easier and safer for routine shop handling. A solution of this type which has shown good versatility and good removal rates may be made by adding to 15 gallons of water the following:

| | Pounds |
|---|---|
| Potassium chloride | 30 |
| Potassium nitrate | 10 |
| Potassium citrate | 10 |
| Rochelle salts | 10 |

This solution, when supplied to the electrode at a temperature between 120° F. and 150° F., will give good removal rates on a wide variety of steels, including stainless steel, and also a great many of the so-called superalloys of nickel, cobalt or iron base and containing as alloying materials, in addition to those three, such materials as chromium, molybdenum, tungsten, titanium, columbium, etc.

In addition to removing material at good rates, a good finish is obtained, and particularly on the high alloy stainless steels and the super-alloys, a bright, reflective surface may be created where the surface is exposed to electrolysis under conditions of pressure and high velocity in the electrolyte, as previously explained.

I have found that an essential to good performance of an electrolyte is that the metal salt products of electrolytic decomposition be readily soluble. For example, aluminium is not easily worked by this process with many electrolytes which are usable on other materials, as the anodic action forms aluminium salts which are not very soluble or not soluble at all and form an anodic film on the work. But a simple 5% or 10% solution of acetic acid yields good results because the relatively complex aluminium salts formed are soluble enough to be readily washed out of the work gap.

Where fine detail of pattern is to be reproduced, it is desirable to use a solution which is considerably more dilute than is desirable for maximum removal rates. Thus, the quantities of salts used in the table above are reduced to one fourth to one sixth of the values shown for the same amount of water. The voltage applied is also reduced. The purpose is to accentuate the difference in removal rate between those areas where the electrode is close to the work and those where it is more remote. If the electrolyte is too conductive and the applied voltage is too high, then the difference in resistance path between areas of close proximity and others of greater spacing is not very great, and the detail of pattern becomes blurred.

Referring to the solution in the table, this has been used successfully in a four-to-one dilution to duplicate coin patterns in the following configuration and procedure. First, a coin is positioned opposite an electrode like that of FIG. 18, using a disc electrode of porous sintered bronze in the form of a disc about one inch in diameter and ⅛ inch thick. The electrolyte is pumped at about 100 p.s.i. through the electrode disc after passing through a filter designed to remove all particles down to five microns. The electrolyzing current is first connected in a sense to make the electrode positive. The electrode is then advanced until it very nearly touches the coin. Then current is turned on at four volts for one or two seconds, the electrode is then advanced, and this is repeated until ample depth has been reached to embrace all of the coin face pattern. Then the coin is removed and replaced with a piece of die steel, and the power leads are reversed so that the electrode is now a cathode. The electrode is now advanced toward the steel, using a voltage of six volts, and again, very close proximity is used—a few ten thousandths of an inch of spacing—and the electrode is advanced into the steel to a depth great enough to embrace the pattern. By this means, it has been possible to reproduce fairly fine detail, and in comparing the height of the coin pattern above its flat areas with the finished steel replica, it has been possible to bring these measurements within less than .001 inch of difference between the original coin and the steel pattern. So far as I am aware, such close copying by electrolytic removal means has never been approached before.

In the foregoing description, various parameters have been described with respect to the apparatus components and the steps which are embodied in the method of carrying out the present invention. In the following claims it is intended that the language used in describing the apparatus components and the method steps be related within the range of permissible and reasonable equivalency to the description and disclosure. For example, it has been found that reasonably good results can be obtained by furnishing the electrolyzing direct current within the range of approximately four to 15 volts. Within this approximate range, and depending upon the resistance in the work gap, the current density will usually be in the range of 100 to 3000 or more amperes per square inch. The resistance in the work gap is determined by the width of the gap and the character of the electrolyte therein. Work gaps of less than .001 inch, e.g., .0005 inch, and as great as .012 inch have been described. When the electrolyte is pumped through such gaps at temperatures in the range of 120° F. to 160° F., a pressure of several atmospheres must be used to inhibit bubbling or boiling of the electrolyte and the consequent reduction of its conductivity. Therefore, the electrolyte is pumped through the gap at pressures within the range of 50 p.s.i. to at least 200 p.s.i. to obtain high back pressure in the work gap with a resultant high electrolyte velocity through the work gap, thereby substantially to raise the boiling point level of the electrolyte so as to inhibit the formation of gas bubbles in the electrolyte and to flush away the eroded workpiece material.

From the above discussion it will be apparent that although this invention may be used for producing shapes and cavities of an irregular character, such that they would be extremely difficult to form by any other process, the invention also has a high order of utility for replacing more conventional machining operations when the workpiece is one of the super-alloys or other material which is for all practical purposes, largely non-machineable. The embodiment illustrated in FIG. 20, for instance, would not be likely to replace an ordinary turning operation on mild steel or other easily machinable materials but its superiority is evident upon hardened tool steel or super-alloys, or other non-machineable materials.

From the above description of my invention as embodied in several alternative variations, it will be appreciated that many changes may be made both in the apparatus and in the method without departing from the scope or spirit of the invention and that the scope of the invention is to be determined from the scope of the accompanying claims.

I claim:
1. An electrode for use in electrolytic shaping apparatus, comprising a hollow metallic member adapted to be connected into an electrolyzing electric circuit, said member having a working and electrically conductive tip at one end thereof adapted to be brought into close spacing relationship with a metallic workpiece to be shaped, said member having an opening opposite said working tip through which an electrolyzing fluid is adapted to be pumped, said member having a minor metallic area contiguous to said tip and exposed laterally to provide controlled lateral electrolytic erosion of the workpiece, and an insulating sheath encasing and secured to said tubular member from said laterally exposed area toward and substantially to said end of said member opposite said working tip.

2. The electrode claimed in claim 1, wherein said member has a minor metallic area contiguous to said tip exposed inwardly, and insulation secured to and covering the inner surface of said member from said last mentioned exposed area a distance substantially away from said tip.

3. The electrode claimed in claim 1, wherein said member is tubular.

4. The electrode claimed in claim 1, wherein said tip is formed as a separate piece and is secured to said hollow member and has a plurality of relatively small exit openings communicating with the interior of said hollow member.

5. The electrode claimed in claim 4, wherein the exterior surface of said tip is slightly recessed in the area of said exit openings.

6. The electrode claimed in claim 1, wherein said tip has a laterally projecting lip to provide controlled lateral electrolytic erosion of the workpiece.

7. The electrode claimed in claim 2, wherein said tip has an outwardly flaring exit opening.

8. The electrode claimed in claim 7, wherein insulation covers and is secured to the inner surface of said hollow member and extends a substantial distance away from said tip.

References Cited

UNITED STATES PATENTS

| 2,308,860 | 1/1943 | Clark | 219—69 |
| 2,385,198 | 9/1945 | Engle | 204—224 |

FOREIGN PATENTS

| 335,003 | 9/1930 | Great Britain. |

HOWARD S. WILLIAMS, *Primary Examiner.*

D. R. JORDAN, *Assistant Examiner.*

U.S. Cl. X.R.

204—224

UNITED STATES PATENT OFFICE
CERTIFICATE OF CORRECTION

Patent No. 3,421,997 January 14, 1969

Lynn A. Williams

It is certified that error appears in the above identified patent and that said Letters Patent are hereby corrected as shown below:

Column 8, line 74, "chamebr" should read -- chamber --. Column 10, line 45 "obserbed" should read -- observed --. Column 11, lines 12 and 17, "enamle", each occurrence, should read -- enamel --. Column 13, line 29, "it" should read -- its --; line 38, "equal" should read -- equally --. Column 26, line 26, after "sheath" insert -- having a thickness not greater than .030 inch --; line 48, after "workpiece" insert -- , said lip projecting outwardly at least as far as the thickness of said insulating sheet --; line 49, the claim reference numeral "2" should read -- 6 --.

Signed and sealed this 24th day of March 1970.

(SEAL)
Attest:

Edward M. Fletcher, Jr.        WILLIAM E. SCHUYLER, JR.
Attesting Officer                     Commissioner of Patents